United States Patent
Itoh

(10) Patent No.: US 7,460,261 B2
(45) Date of Patent: Dec. 2, 2008

(54) PRINTING SYSTEM, PRINTING MANAGEMENT DEVICE, PRINT SERVER, PRINTING METHOD, AND STORAGE MEDIUM

(75) Inventor: Masanori Itoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1041 days.

(21) Appl. No.: 10/742,971

(22) Filed: Dec. 23, 2003

(65) Prior Publication Data

US 2004/0190049 A1    Sep. 30, 2004

(30) Foreign Application Priority Data

Dec. 27, 2002  (JP)  ............................. 2002-379959
Jan. 7, 2003   (JP)  ............................. 2003-000882
Jan. 7, 2003   (JP)  ............................. 2003-000962

(51) Int. Cl.
  *G06F 15/00* (2006.01)
  *G06F 15/16* (2006.01)
(52) U.S. Cl. ..................................... 358/1.15; 709/206
(58) Field of Classification Search ............. 358/1.15, 358/1.14, 1.18; 709/219, 206, 230; 399/8, 399/81
See application file for complete search history.

(56) References Cited

U.S. PATENT DOCUMENTS

| 5,742,801 | A  |   | 4/1998 | Fukushima et al. |
|-----------|----|---|--------|------------------|
| 6,453,127 | B2 | * | 9/2002 | Wood et al. ................... 399/8 |
| 2003/0118162 | A1 |   | 6/2003 | Itoh |
| 2003/0123647 | A1 |   | 7/2003 | Itoh |

FOREIGN PATENT DOCUMENTS

JP    2001-216237    8/2001

* cited by examiner

*Primary Examiner*—Saeid Ebrahimi Dehkordy
(74) *Attorney, Agent, or Firm*—Dickstein Shapiro LLP

(57) ABSTRACT

In a printing system, a printing management server is provided to receive a document specific data identifying a print-out document from a mobile station and transmit the document specific data to a print server. The printing management server transmits a reservation identification data identifying a printing reservation of the print-out document to both the mobile station and a printing management terminal. The printing management terminal receives a printable data of the print-out document and causes a printer to perform printing of the print-out document when the reservation identification data is received.

29 Claims, 13 Drawing Sheets

PRINT-OUT DOCUMENT CHOICE

- ☑ 1ST DOCUMENT
- ☐ 2ND DOCUMENT
- ☐ 3RD DOCUMENT
- ☐ 4TH DOCUMENT
- ☐ 5TH DOCUMENT
- ☐ 6TH DOCUMENT
- ☐ 7TH DOCUMENT

[OK] 1191  [RETURN] 1192

PRINT-OUT LOCATION CHOICE

| | |
|---|---|
| 1 | AKIHABARA |
| 2 | IKEBUKURO |
| 3 | UENO |
| 4 | EBISU |
| 5 | OHSAKI |
| 6 | KANDA |
| 7 | SHINAGAWA |

[OK] 1291  [RETURN] 1292

PRINTING SYSTEM, PRINTING MANAGEMENT DEVICE, PRINT SERVER, PRINTING METHOD, AND STORAGE MEDIUM

BACKGROUND OF THE INVENTION

1. Field of the Invention

The present invention relates to a printing system, a printing management device, a print server, a world-wide-web server, a printing method, and a storage medium which are used for making a printout of accumulated documents.

2. Description of the Related Art

In recent years, with the spreading of mobile stations, such as cellular phones and PDAs (personal digital assistants), various kinds of data can be acquired through the mobile communications network not only at the indoor locations, such as the house or the office, but also at the outdoor locations.

For example, when the user who carries a mobile station which is capable of accessing the Internet goes out from the office to a certain destination place, the user is able to check the train transfer data on the mobile station's display at a nearby station of the office, and able to check the map near the destination place on the mobile station's display at a nearby station of the destination place.

However, the user is unable to view the information exceeding the display capability of the mobile station on the display. For example, in a cellular phone, only the information that can be displayed by using the browsing functions of the cellular phone, such as a C-HTML (compact hypertext markup language) file, a HDML (handheld device markup language) file, and a WML (wireless markup language) file, can be viewed fundamentally.

Even when the user carries a PDA which is superior in display capacity from the cellular phone, only the file corresponding to the application program installed in the PDA can be viewed. For example, a specific document edit application file, a specific spreadsheet application file, etc. cannot be viewed unless the corresponding application program is installed in the PDA.

Specifically, even if a sales person who carries a PDA and goes out to a destination place is able to access the server which retains a product price table created with a specific document edit application program, the user is unable to view the product price table unless the corresponding application program is installed in the PDA.

Moreover, even if the network which can be used at a fixed communication terminal is changed to a broadband network, the network which can be used with the mobile station does not have an adequately high transmission speed.

Moreover, even if the file format which can be displayed with a mobile station is used, the user of the mobile station is generally unable to view the information of a file having a large-size on the display. Even if the information of such a file having a large size can be viewed partially, the display screen of the mobile station is small, and the user is able to view only a small amount of the information contained in the file at a time.

Moreover, the mobile station hardware has such restrictions that a small number of pixels can be used for the display screen.

To eliminate the problem, the ordinary method is that the information only for the mobile station which meets the hardware restriction of the mobile station is generated and the user is provided with such information only for the mobile station.

However, the information only for the mobile station has the tendency that the amount of the characters increases when the information contains few images. Moreover, there is the tendency that the image with a low resolution is supplied. The contents of the information are hard to view or to understand.

Therefore, there is the demand for making a printout of the information in the format which cannot be displayed on the display screen of the mobile station, and a printout of the information of a file having a large data size though it can be displayed. The printed matter is finally supplied to the user, and the request for viewing the information is satisfied with the printed matter.

A conventional printing system is provided to receive a printing request from a mobile station. For example, when the request and the printing data including the printing number of sheets are received from the mobile station, the conventional printing system outputs the printing data to the printer based on the request from the mobile station, so that the printing of the printing data is carried out at the printer. For example, Japanese Laid-Open Patent Application No. 2001-216237 discloses such printing system.

However, at the outdoor locations, generally, there is no printer in the vicinity of the user who moves. When the printer is found out, the information is chosen at the print-out location and the printing request is carried out at the printer, it may become clear that the selected information cannot be printed only after carrying out the printing request at the print-out location.

For example, when a print driver corresponding to the printer is not installed in the mobile station, the printing of the selected information is impossible.

Even when the print driver corresponding to the printer can be downloaded at the print-out location through a network, the acquired print driver may not operate normally depending on the specifications of the mobile station. Moreover, the fact that the printing of the selected information is impossible may become clear at the print-out location since the selected information is not the type which corresponds to the print driver or the printer.

It is possible that a test printing of the information of the same type as that of the selected information is carried out, in advance, at the remote print-out location, and the printing of the selected information is performed later. However, the check or sending of the result of the test printing must be requested to a person who is at the print-out location. If the person is not at the print-out location, the check of the result of the test printing cannot be requested.

Moreover, the problem also arises when the information is chosen and the printing request is carried out at a distant place from the print-out location. If the printing is finished earlier than the time the user reaches the print-out location and another person takes the user's printed matter away, the user cannot acquire the printed matter.

SUMMARY OF THE INVENTION

An object of the present invention is to provide an improved printing system in which the above-described problems are eliminated.

Another object of the present invention is to provide a printing system which enables the user of a mobile station to acquire a desired printed matter certainly at a selected print-out location.

Another object of the present invention is to provide a printing management device which enables the user of a mobile station to acquire a desired printed matter certainly at a selected print-out location.

Another object of the present invention is to provide a print server which enables the user of a mobile station to acquire a desired printed matter certainly at a selected print-out location.

Another object of the present invention is to provide a world-wide-web server which enables the user of a mobile station to acquire a desired printed matter certainly at a selected print-out location.

Another object of the present invention is to provide a printing method which enables the user of a mobile station to acquire a desired printed matter certainly at a selected print-out location.

Another object of the present invention is to provide a computer-readable storage medium which enables the user of a mobile station to acquire a desired printed matter certainly at a selected print-out location.

The above-mentioned objects of the present invention are achieved by a printing system designed to operate on a network, the printing system comprising: a printing terminal connected to the network and printing a print-out document; a communication terminal connected to the network and transmitting a printing request of the print-out document; a WWW server connected to the network and communicating with the communication terminal via the network; a printing management device connected to the network and transmitting a printing-related data to the communication terminal through the WWW server; and a document converter connected to the network and converting the print-out document into a printable data for the printing terminal when the print-out document is not in a printable form that is appropriate for the printing terminal, wherein the printing management device acquires a document specific data identifying the print-out document from the communication terminal and transmits the document specific data to the document converter, and the printing management device transmitting a reservation identification data identifying a printing reservation of the print-out document to both the communication terminal and the printing terminal, and the printing terminal acquiring the printable data and performing printing of the print-out document when the reservation identification data is received.

The above-mentioned objects of the present invention are achieved by a printing management device for use in a printing system, the printing system designed to operate on a network and comprising a printing terminal connected to the network and printing a print-out document, a communication terminal connected to the network and transmitting a printing request of the print-out document, a WWW server connected to the network and communicating with the communication terminal via the network, a document converter connected to the network and converting the print-out document into a printable data for the printing terminal when the print-out document is not in a printable form that is appropriate for the printing terminal, and the printing management device connected to the network and transmitting a printing-related data to the communication terminal through the WWW server, the printing management device comprising: a first unit acquiring a document specific data identifying the print-out document from the communication terminal and transmitting the document specific data to the document converter; a second unit transmitting a reservation identification data identifying a printing reservation of the print-out document to both the communication terminal and the printing terminal; and a third unit transmitting the printable data from the document converter to the printing terminal, so that the printing terminal performs printing of the print-out document when the reservation identification data is received.

The above-mentioned objects of the present invention are achieved by a computer-readable storage medium storing a program embodied therein for causing a computer of a printing management device to execute a printing method, the printing management device adapted for use in a printing system, the printing system designed to operate on a network and comprising a printing terminal connected to the network and printing a print-out document, a communication terminal connected to the network and transmitting a request of the print-out document, a WWW server connected to the network and communicating with the communication terminal via the network, a document converter connected to the network and converting the print-out document into a printable data for the printing terminal when the print-out document is not in a printable form that is appropriate for the printing terminal, and the printing management device connected to the network and transmitting a printing-related data to the communication terminal through the WWW server, the printing method comprising: acquiring a document specific data identifying the print-out document from the communication terminal and transmitting the document specific data to the document converter; transmitting a reservation identification data identifying a printing reservation of the print-out document to both the communication terminal and the printing terminal; and transmitting the printable data from the document converter to the printing terminal, so that the printing terminal performs printing of the print-out document when the reservation identification data is received.

The above-mentioned objects of the present invention are achieved by a printing system designed to operate on a network, comprising: a document server connected to the network and storing a plurality of documents; a printing terminal connected to the network and printing a print-out document; a communication terminal connected to the network and transmitting a request of the print-out document; a print server connected to the network and converting the print-out document into a printable data appropriate for the printing terminal; and a printing management device connected to the network and requesting the print server to perform the conversion of the print-out document into the printable data after the request of the print-out document is transmitted from the communication terminal; wherein the print server receives a document specific data identifying the print-out document from the printing management device, and performs the conversion of the print-out document indicated by the document specific data into the printable data.

The above-mentioned objects of the present invention are achieved by a print server for use in a printing system, the printing system designed to operate on a network and comprising a document server connected to the network and storing a plurality of documents, a printing terminal connected to the network and printing a print-out document, a communication terminal connected to the network and transmitting a request of the print-out document, and a printing management device connected to the network and requesting the print server to perform a conversion of the print-out document into a printable data appropriate for the printing terminal after the request of the print-out document is transmitted from the communication terminal, the print server connected to the network and comprising: a first unit receiving a document specific data identifying the print-out document from the printing management device; a second unit receiving the print-out document, identified by the document specific data, from the document server; and a third unit performing the conversion of the print-out document, received from the document server, into the printable data.

The above-mentioned objects of the present invention are achieved by a computer-readable storage medium storing a program embodied therein for causing a computer of a print server to execute a printing method, the print server adapted for use in a printing system, the printing system designed to operate on a network and comprising a document server connected to the network and storing a plurality of documents, a printing terminal connected to the network and printing a print-out document, a communication terminal connected to the network and transmitting a request of the print-out document, a printing management device connected to the network and requesting the print server to perform a conversion of the print-out document into a printable data appropriate for the printing terminal after the request of the print-out document is transmitted from the communication terminal, and the print server connected to the network, the printing method comprising: receiving a document specific data identifying the print-out document from the printing management device; receiving the print-out document, identified by the document specific data, from the document server; and performing the conversion of the print-out document, received from the document server, into the printable data.

The above-mentioned objects of the present invention are achieved by a printing system designed to operate on a network and comprising: a printing terminal connected to the network and printing a print-out document; a communication terminal connected to the network and transmitting a request of the print-out document; a WWW server connected to the network and communicating with the communication terminal via the network; and a document converter connected to the network and converting the print-out document into a printable data for the printing terminal when the print-out document is not in a printable form that is appropriate for the printing terminal, wherein the WWW server receives a document specific data identifying the print-out document from the communication terminal and transmits a reservation identification data identifying a printing reservation of the print-out document to the communication terminal, and the printing terminal acquires the printable data or the print-out document and performs printing of the print-out document when the reservation identification data is received.

The above-mentioned objects of the present invention are achieved by a WWW server for use in a printing system, the printing system designed to operate on a network and comprising a printing terminal connected to the network and printing a print-out document, a communication terminal connected to the network and transmitting a request of the print-out document, the WWW server connected to the network and communicating with the communication terminal via the network, and a document converter connected to the network and converting the print-out document into a printable data for the printing terminal when the print-out document is not in a printable form that is appropriate for the printing terminal, the WWW server comprising: a first unit receiving a document specific data identifying the print-out document from the communication terminal; and a second unit transmitting a reservation identification data identifying a printing reservation of the print-out document to the communication terminal, so that the printing terminal acquires the printable data or the print-out document and performs printing of the print-out document when the reservation identification data is received.

The above-mentioned objects of the present invention are achieved by a computer-readable storage medium storing a program embodied therein for causing a computer of a WWW server to execute a printing method, the WWW server adapted for use in a printing system, the printing system designed to operate on a network and comprising a printing terminal connected to the network and printing a print-out document, a communication terminal connected to the network and transmitting a request of the print-out document, the WWW server connected to the network and communicating with the communication terminal via the network, and a document converter connected to the network and converting the print-out document into a printable data for the printing terminal when the print-out document is not in a printable form that is appropriate for the printing terminal, the printing method comprising: receiving a document specific data identifying the print-out document from the communication terminal; and transmitting a reservation identification data identifying a printing reservation of the print-out document to the communication terminal, so that the printing terminal acquires the printable data or the print-out document and performs printing of the print-out document when the reservation identification data is received.

The above-mentioned objects of the present invention are achieved by a printing method for use in a printing system designed to operate on a network and comprising a printing terminal connected to the network to print a print-out document, and a communication terminal connected to the network to transmit a request of the print-out document, the printing method adapted to cause the printing terminal to perform printing of the print-out document requested by the communication terminal, the printing method comprising: receiving a document specific data identifying the print-out document from the communication terminal; converting the print-out document into a printable data for the printing terminal when the print-out document is not in a printable form that is appropriate for the printing terminal; transmitting a reservation identification data identifying a printing reservation of the print-out document to the communication terminal; transmitting the printable data or the print-out document to the printing terminal; and causing the printing terminal to perform printing of the print-out document when the reservation identification data is received at the printing terminal.

In the printing system of the present invention, it is not necessary to install the print driver in the communication terminal (for example, a mobile station). When the communication terminal at a remote location away from the printing terminal (for example, a printing management terminal with a printer or a combination thereof) transmits a printing request of the print-out document, the document converter converts the print-out document into a printable data. The printing terminal acquires the printable data from the document converter. Later, the user of the communication terminal arrives at the selected print-out location where the printing terminal exists, and inputs the reservation identification data to the printing terminal. The printing terminal performs the printing of the print-out document when the reservation identification data is received.

According to the printing system, the printing management device, the print server, the world-wide-web server, the printing method and the storage medium of the invention, it is possible to provide the outstanding advantage that the user of a mobile station can acquire a desired printed matter certainly at a selected print-out location.

BRIEF DESCRIPTION OF THE DRAWINGS

Other objects, features and advantages of the present invention will be apparent from the following detailed description when read in conjunction with the accompanying drawings.

FIG. 11 is a diagram showing a display data of print-out document choice displayed on a mobile station in the printing system of the present embodiment.

FIG. 12 is a diagram showing a display data of print-out location choice displayed on a mobile station in the printing system of the present embodiment.

DETAILED DESCRIPTION OF PREFERRED EMBODIMENTS

A description will now be given of the preferred embodiments of the present invention with reference to the accompanying drawings.

Figure 1:
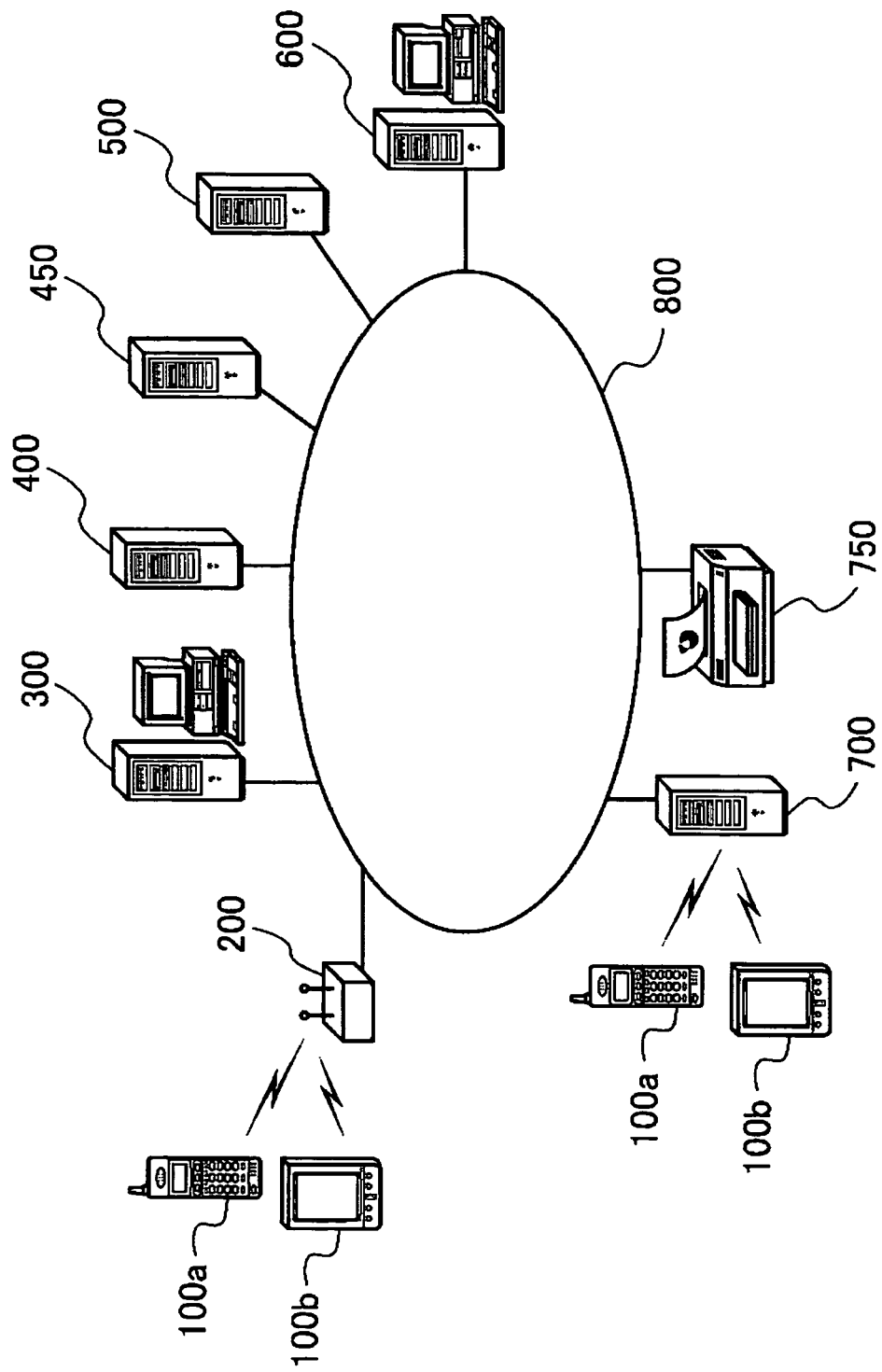
FIG. 1 is a diagram showing an embodiment of the printing system of the invention.

FIG. 1 shows the composition of an embodiment of the printing system of the invention.

As shown in FIG. 1, the printing system is designed to operate on a network 800 and includes a mobile station 100 (a cellular phone 100a or a PDA 100b), a relay station 200, a WWW (world-wide-web) server (also called a web server) 300, a printing management server 400, a directory server 450, a print server 500, a document server 600, a printing management terminal 700, and a printer 750 which are connected to the network 800.

The mobile station 100 is carried by the user. The relay station 200 relays the communications between the mobile station 100 and the respective devices on the network 800. The WWW server 300 communicates with the mobile station 100 through the relay station 200. The printing management server 400 manages the printing reservation and the document printing. The directory server 450 provides the directory information of the respective devices on the network 800. The document server 600 accumulates the documents. The print server 500 converts a print-out document into a printable data suitable for the printer 750 when the print-out document, accumulated in the document server 600, is not in a printable form which is appropriate for the printer 750. The printing management terminal 700 controls the printer 750 to print the print-out document.

The mobile station 100 in the present embodiment constitutes a communication terminal of the invention. Moreover, the printing management server 400 constitutes a printing management device of the invention. The document server 600 constitutes a document transmitting device which provides the print server 500 with the print-out document. Moreover, the printing management terminal 700 and the printer 750 constitute a printing terminal of the invention.

Figure 2:
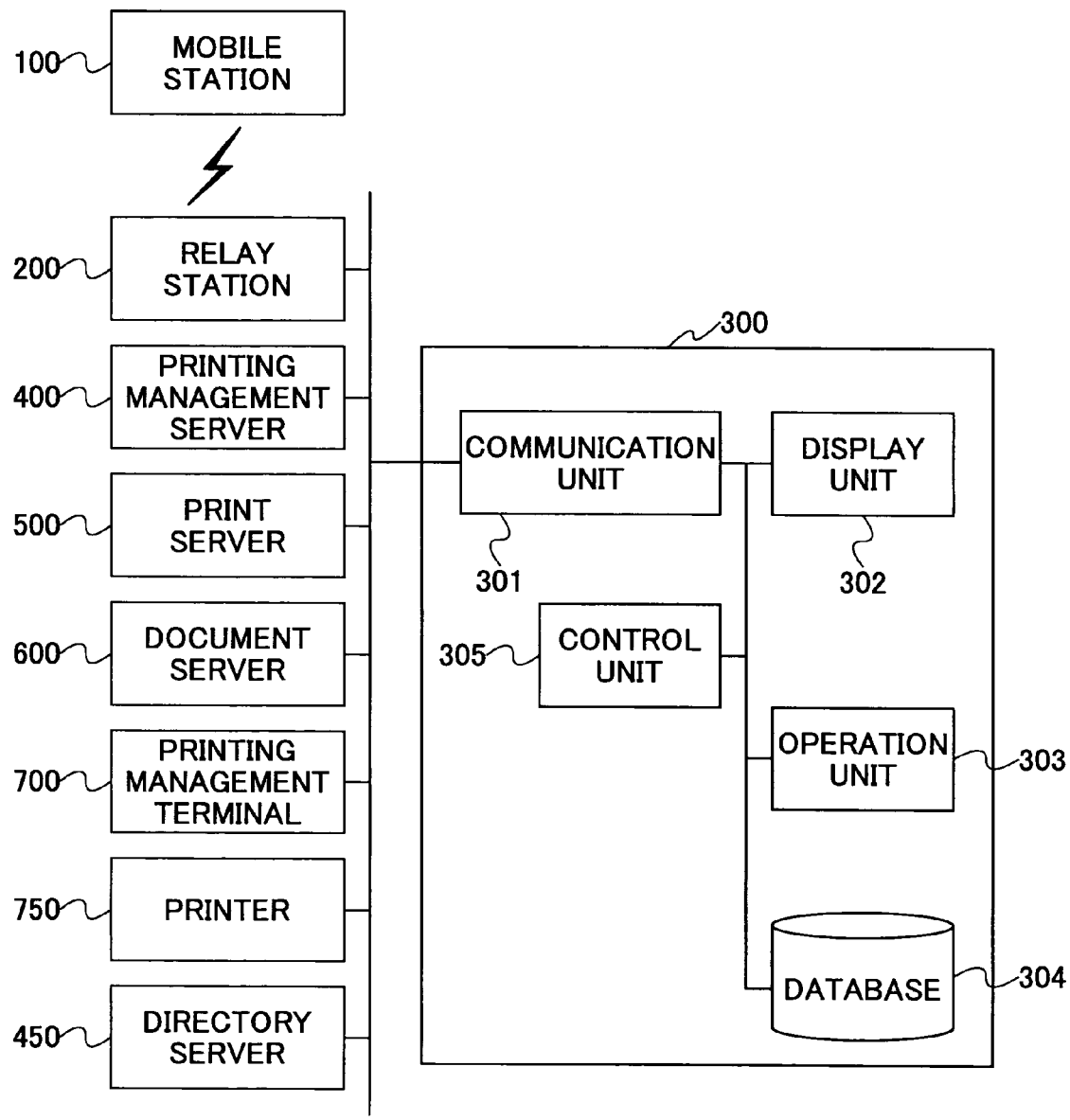
FIG. 2 is a block diagram of an embodiment of a web server in the printing system of the present embodiment.

FIG. 2 shows an embodiment of the web server 300 in the printing system of the present embodiment of the invention.

As shown in FIG. 2, the communication unit 301 communicates with the respective devices on the network 800. The display 302 displays various kinds of information. The operation unit 303 is provided for an administrative person or the like to operate the operation unit 303. The database 304 is provided to store various kinds of information. The control unit 305 controls the respective elements of the web server 300.

The communication unit 301 of the web server 300 acquires a document list from the document server 600, and transmits display data of the document list to the mobile station 100. In the present embodiment, this display data is provided as the information for choosing the print-out document from the documents accumulated beforehand in the document server 600. This display data is generated by the control unit 305 of the web server 300 based on the acquired document list.

Moreover, the communication unit 301 of the web server 300 acquires document specific information, which identifies the print-out document, from the mobile station 100.

Moreover, the communication unit 301 of the web server 300 acquires document authentication information, which is used for authentication by the document server 600 when taking out the print-out document from the document server 600, from the document server 600. In the present embodiment, the document authentication information contains the document specific information.

Moreover, the communication unit 301 of the web server 300 acquires from the printing management server 400 a print-out location list, and transmits display data of the print-out location list to the mobile station 100. In the present embodiment, this display data is provided as the information for choosing the print-out location of the print-out document. The display data is generated by the control unit 305 of the web server 300 based on the acquired print-out location list.

Moreover, the communication unit 301 of the web server 300 acquires print-out location specific information, which identifies the print-out location, from the mobile station 100.

Moreover, the communication unit 301 of the web server 300 provides the mobile station 100 with a display data that is generated based on the printing functional information for every print-out location acquired from the printing management server 400. In the present embodiment, this display data is provided as the printing condition selection information for choosing the printing conditions of the print-out document. The display data is generated by the control unit 305 of the web server 300 based on the printing functional information of the print-out location.

Moreover, the communication unit 301 of the web server 300 acquires printing condition information of the print-out document from the mobile station 100.

Moreover, the communication unit 301 of the web server 300 transmits a notification to the printing management server 400 in response to the reservation request or the printing request which is received from the mobile station 100.

Moreover, the communication unit 301 of the web server 300 transmits the print-out document specific information, the print-out location specific information, and the printing condition information, which are acquired from the mobile station 100, to the printing management server 400.

Moreover, the communication unit 301 of the web server 300 transmits the document authentication information of the print-out document, which is required to acquire the print-out document from the document server 600, to the printing management server 400. In the present embodiment, the document authentication information contains the document specific information.

Moreover, the communication unit 301 of the web server 300 acquires the reservation information (which includes the reservation identification information identifying the printing reservation of the print-out document, and the printing authority information indicating the printing authority of the print-out document) concerning the printing reservation from the printing management server 400, and transmits the reservation information to the mobile station 100.

Moreover, the communication unit 301 of the web server 300 receives the working-state information request concerning the printing reservation from the mobile station 100, acquires the working-state information from the printing management server 400 in response to the request, and transmits the working-state information to the mobile station 100.

Moreover, the communication unit 301 of the web server 300 receives from the mobile station 100 the request (the reservation information transfer request) for transmitting the reservation information to a different mobile station 100.

The reservation information transfer request contains the reservation information transfer point information. When the communication unit 301 of the web server 300 receives the reservation information transfer request, the control unit 305 of the web server 300 generates an e-mail containing the destination address indicated by the reservation information transfer point information. The reservation information is appended to this e-mail by the control unit 305 of the web server 300.

Moreover, the communication unit 301 of the web server 300 transmits the e-mail with the reservation information being appended to the destination address (indicated by the reservation information transfer point information) through the mail server (illustration is omitted). Thus, the reservation information is transmitted to the mobile station which is different from the mobile station 100 which requested the printing reservation.

In the above-mentioned embodiment, the mobile station 100 is described as the communication terminal which requested the printing reservation. Alternatively, the communication terminal which requested the printing reservation may be a fixed communication terminal (illustration is omitted) on another network 800 or a desktop type personal computer.

Figure 3:
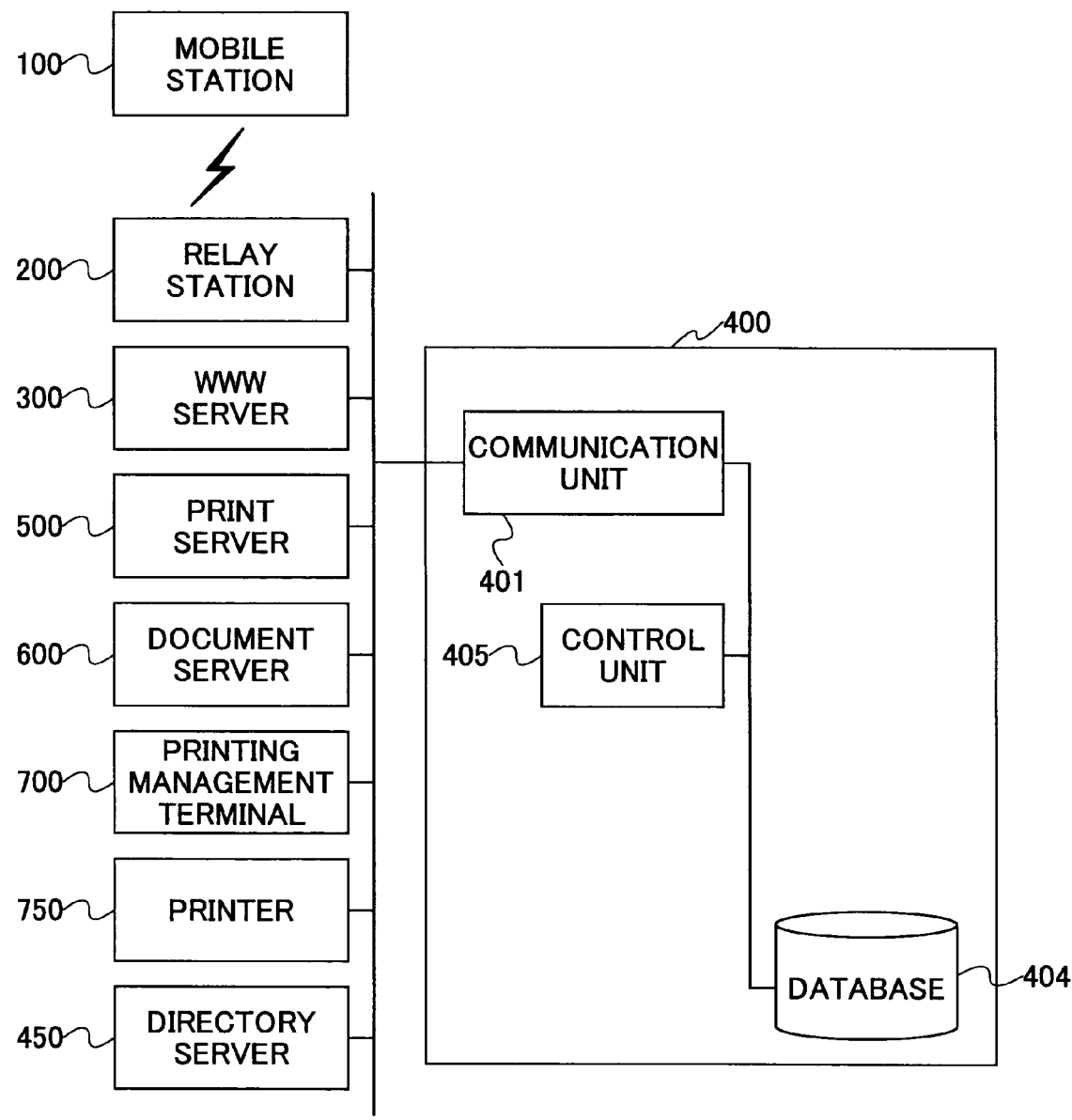
FIG. 3 is a block diagram of an embodiment of a printing management server in the printing system of the present embodiment.

FIG. 3 shows an embodiment of the printing management server 400 in the printing system of the present embodiment of the invention.

As shown in FIG. 3, the communication unit 401 communicates with the respective devices on the network 800. The database 404 stores the print-out location list for indicating two or more print-out locations, and the printing functional information for every print-out location, and other information. The control unit 405 controls the respective elements of the printing management server 400.

The communication unit 401 of the printing management server 400 transmits the print-out location list and the print-out location functional information of the print-out location to the mobile station 100 through the web server 300.

Moreover, the communication unit 401 of the printing management server 400 acquires the document specific information, the print-out location specific information, and the printing condition information from the mobile station 100 through the web server 300.

Moreover, the document authentication information of the print-out document, which is required to acquire the print-out document from the document server 600, is acquired from the web server 300. In the present embodiment, the document authentication information contains the document specific information.

Moreover, the communication unit 401 of the printing management server 400 acquires the reservation request or the printing request from the mobile station 100 through the web server 300. In the present embodiment, the communication unit 401 of the printing management server 400 acquires the document authentication information (in which the document specific information is included), the print-out location specific information, and the printing condition information from the web server 300, in addition to the reservation request or the printing request. The document specific information, the print-out location specific information, and the printing condition information are the information outputted from the mobile station 100.

Moreover, the control unit 405 of the printing management server 400 generates the reservation information. Moreover, the communication unit 401 of the printing management server 400 transmits the reservation information (which includes the reservation identification information and the printing authority information) to the mobile station 100 through the web server 300.

Moreover, the communication unit 401 of the printing management server 400 transmits the reservation information (which includes the document authentication information and the printing condition information) to the print server 500. In the present embodiment, the document authentication information contains the document specific information.

Moreover, the communication unit 401 of the printing management server 400 transmits the reservation information (which includes the reservation identification information, the printing authority information and the printable data storing location information or the print-out document storing location information) to the printing management terminal 700.

Moreover, the communication unit 401 of the printing management server 400 acquires the printable data of the print-out document from the print server 500, and transmits the same to the printing management terminal 700.

When it is not necessary to perform the document conversion of the document accumulated in the document server 600 into the printable data by the print server 500 (for example, when the print-out document accumulated in the document server 600 is in the printable form that can be printed by the printer 750), the original document data (or the original print-out document) is transmitted to the printing management terminal 700 without performing the document conversion.

Moreover, the control unit 405 of the printing management server 400 manages the working-state information. For example, the working-state information generated by the control unit 405 may include the information as to whether the printing reservation is received normally, the information as to whether the conversion of the print-out document into the printable data is completed normally, the information as to whether the transfer of the printable data or the original document data to the printing management terminal 700 is completed normally, the information as to whether the printing reservation is completed normally, the information indicating that the printer is under printing, the information as to whether the printing of the document is completed, and the information as to whether the number of times of printing or the print permissible term is exceeded. Such working-state information is generated and stored in the database 404 of the printing management server 400 by the control unit 405.

Moreover, the communication unit 401 of the printing management server 400 acquires the working-state information request from the mobile station 100 through the web server 300. In response to the received request, the communication unit 401 of the printing management server 400 provides the mobile station 100 with the working-state information through the web server 300.

Figure 4:
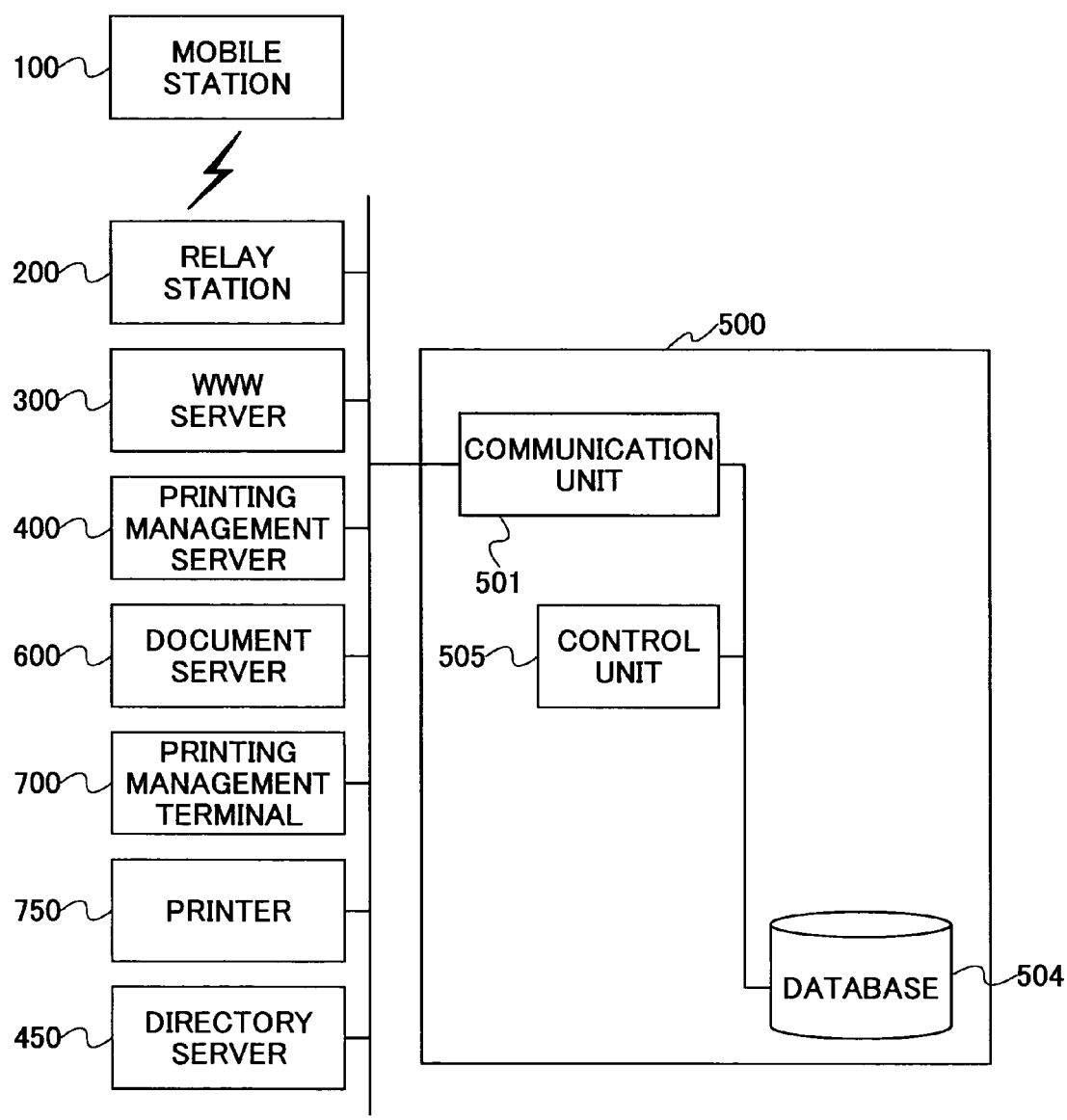
FIG. 4 is a block diagram of an embodiment of a print server in the printing system of the present embodiment.

FIG. 4 shows an embodiment of the print server 500 in the printing system of the present embodiment of the invention.

As shown in FIG. 4, the communication unit 501 communicates with the respective devices on the network 800. Various kinds of information is stored in the database 504. The control unit 505 controls the respective units of the print server 500.

The communication unit 501 of the print server 500 acquires the reservation information (which includes the document authentication information and the printing condition information) from the printing management server 400. In the present embodiment, the document authentication information contains the document specific information.

The communication unit 501 of the print server 500 acquires the print-out document from the document server 600 by using the document authentication information.

When the print-out document is in a form which cannot be printed by the printer 750, the control unit 505 of the print server 500 converts the print-out document into the printable data (for example, the printable data is in the form of PostScript (registered trademark)) which can be printed by the printer 750. In the present embodiment, the document conversion into the printable data is performed by the control unit 505 based on the printing condition information outputted from the mobile station-100 and acquired through the web server 300 and the printing management server 400.

The communication unit 501 of the print server 500 provides the printing management server 400 with the printable data or the original data of the print-out document.

Similar to the print server 500 of FIG. 4, the printing management terminal 700 of FIG. 1 is provided with a communication unit (illustration is omitted) which communicates with the respective devices on the network 800, a storage unit (illustration is omitted) which stores various kinds of information, and a control unit (illustration is omitted) which controls the respective units of the printing management terminal 700.

The communication unit of the printing management terminal 700 acquires the reservation information (which includes the reservation identification information, the printing authority information and the printable data storing location information or print-out document storing location information) from the printing management server 400.

Moreover, the communication unit of the printing management terminal 700 acquires the printable data or the original data of the print-out document through the printing management server 400.

The storage unit of the printing management terminal 700 stores the printable data or the original data of the print-out document correlated with the reservation identification information. In the present embodiment, the printable data is the data into which the print-out document, corresponding to the document specific information notified from the mobile station 100 to the web server 300, is converted by the print server 500. Moreover, the original data is the data of the print-out document stored in the document server 600 when the original data of the print-out document is in the printable form which can be printaed printer 750.

The communication unit of the printing management terminal 700 acquires the printing request with the reservation information attached thereto from the mobile station 100.

When the printing request with the reservation information is received from the mobile station 100, the communication unit of the printing management terminal 700 transmits the printable data or the original data of the print-out document to the printer 750, so that the printer 750 performs the printing of the print-out document. The reservation information attached to the printng request includes the reservation identification information and the printing authority information. The control unit of the printing management terminal 700 checks a matching between the printing authority information beforehand acquired from the printing management server 400 and the printing authority information acquired from the mobile station 100, and makes a determination as to whether the printer 750 is caused to perform the printing of the print-out document, based on a result of the matching.

In addition, when the printing request is received through the web server 300 from the mobile station 100, the communication unit of the printing management terminal 700 acquires the printing request with the reservation information through the printing management server 400.

The printer 750 of FIG. 1 acquires the printable data or the original data of the print-out document from the printing management terminal 700, and performs the printing of the print-out document.

Figure 5:
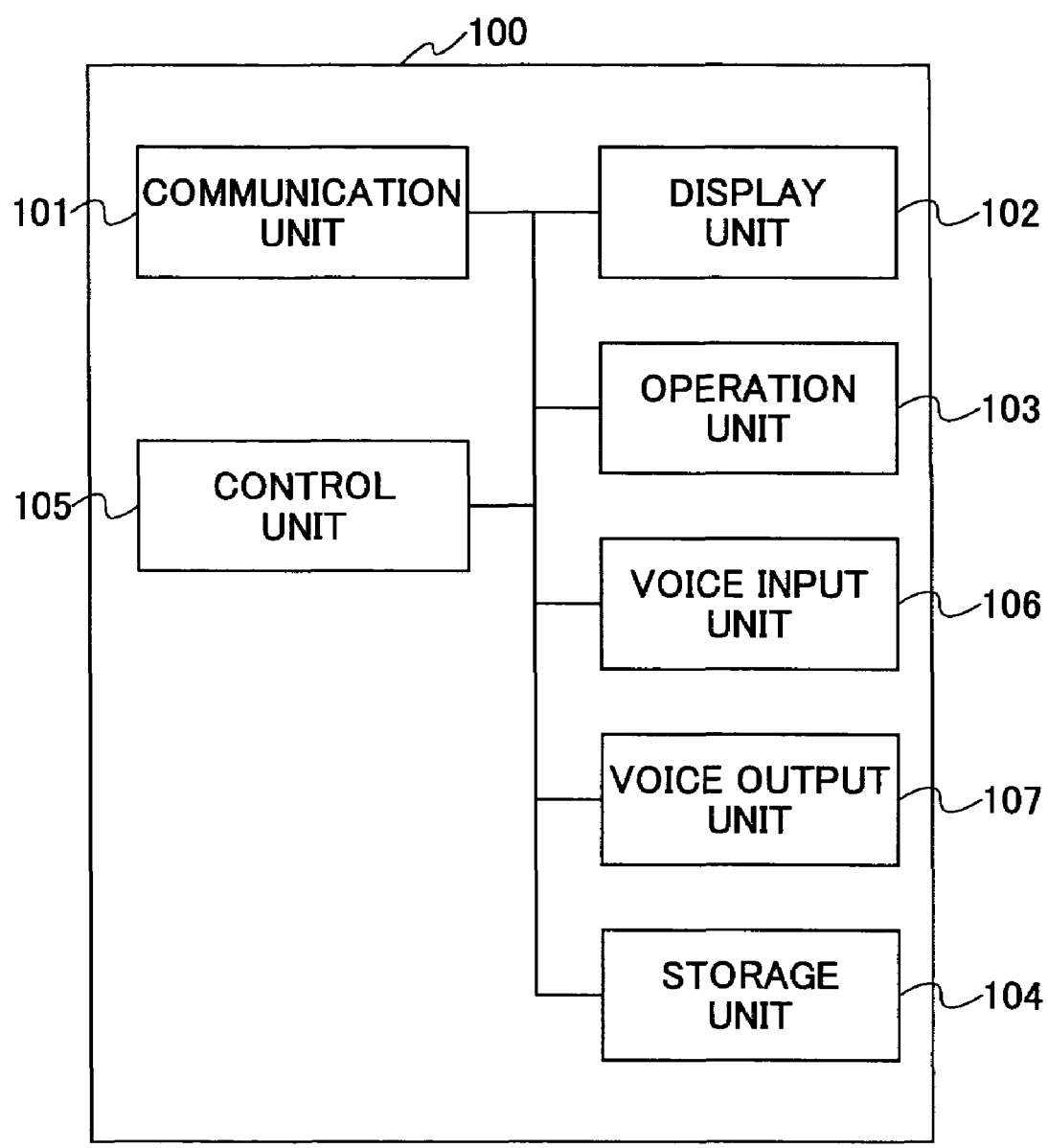
FIG. 5 is a block diagram of an embodiment of a mobile station in the printing system of the present embodiment.

FIG. 5 shows an embodiment of the mobile station 100 in the printing system of the present embodiment of the invention.

As shown in FIG. 5, the communication unit 101 communicates with the respective devices on the network 800. The display 102 displays various kinds of information. The operation unit 103 is provided for the user to perform operation on the operation unit 103. The storage unit 104 stores various kinds of information. The control unit 105 controls the respective units of the mobile station 100.

The display 102 of the mobile station 100 of FIG. 5 displays the display data for choosing the print-out document. Moreover, the operation unit 103 of the mobile station 100 receives the operation which chooses the print-out document from the documents accumulated in the document server 600. Moreover, the display 102 of the mobile station 100 displays the display data for choosing the print-out location. Moreover, the operation unit 103 of the mobile station 100 receives the operation which chooses the print-out location.

Moreover, the display 102 of the mobile station 100 displays the display data for choosing the printing conditions in the print-out location. Moreover, the operation unit 103 of the mobile station 100 receives the operation which chooses the printing conditions. Moreover, the display 102 of the mobile station 100 displays the display data of the reservation information (which includes the reservation identification information), and gives the indication that requests the user to store the reservation information into the storage unit 104 of the mobile station 100.

Moreover, the operation unit 103 of the mobile station 100 receives operation of storing the reservation information from the user. Moreover, the storage unit 104 of the mobile station 100 stores the reservation information (which includes the reservation identification information and the printing authority information).

In addition, the communications using the HTTP (hypertext transfer protocol) and the SOAP (simple object access protocol) are performed between various servers on the network 800, such as the web server 300, the printing management server 400, the print server 500, and the document server 600.

Although other protocols may be used without using HTTP, the HTTP communications on the Internet are usually used in many cases also in the site requiring the severe security, and the present embodiment is convenient to the user. Moreover, although other protocols may be used without using SOAP, the protocol of the present embodiment is easy to use when using the web service on other servers, and the present embodiment is convenient to the user.

It is assumed that, in the following description, the communications between the various servers on the network 800 use the HTTP and the SOAP.

In addition, the document specific information is the information identifying the print-out document or the other documents, such as a document name or a document set name for a set of print-out documents. The document specific information may include the information which indicates the storing location of the document.

Moreover, the print-out location specific information is the information which indicates the identification information of the print-out location, the identification information of the location of of the printer, the IP address of the print-out location, the MAC (media access control) address of the print-out location, the network path of the print-out location, the print-server name of the print-out location, and other print-out locations.

Moreover, the printing conditions may change depending on the printing functional information of the print-out location, and may include the color/monochrome printing, the double-sided printing, the intensive printing, the sheet size, the magnification, the quality of image, the sheet tray, the output tray, the stapler binding, the form kind, the sorting, the punch, the composition, the printing direction, the sheet orientation, the printing number of copies, and the other printing conditions.

Moreover, the reservation information may include the reservation number, the reservation name, the document name, the document set name for a set of print-out documents, the total data size of the print-out document, the print-out location specific information, the printing condition information, the reservation date indicating the date when the printing reservation is perfrmed, the permissible term indicatng the term within which the print-out document can be printed, the user identification information identifying the user who performs the printing reservation, the password, the printing authority information, the printable data storing location information, the print-out document storing location information, and the other printing reservation information.

In addition, the reservation information contains at least the reservation identification information which identifies the printing reservation of the print-out document.

The reservation identification information may be the user's identification information given per reservation of the reservation number, the reservation name, and others, may be the user number, the user name, and the identification information given per other users, and may be the other identification information.

It is assumed that, in the present embodiment, the printing reservation is identified by the reservation name.

Figure 6:
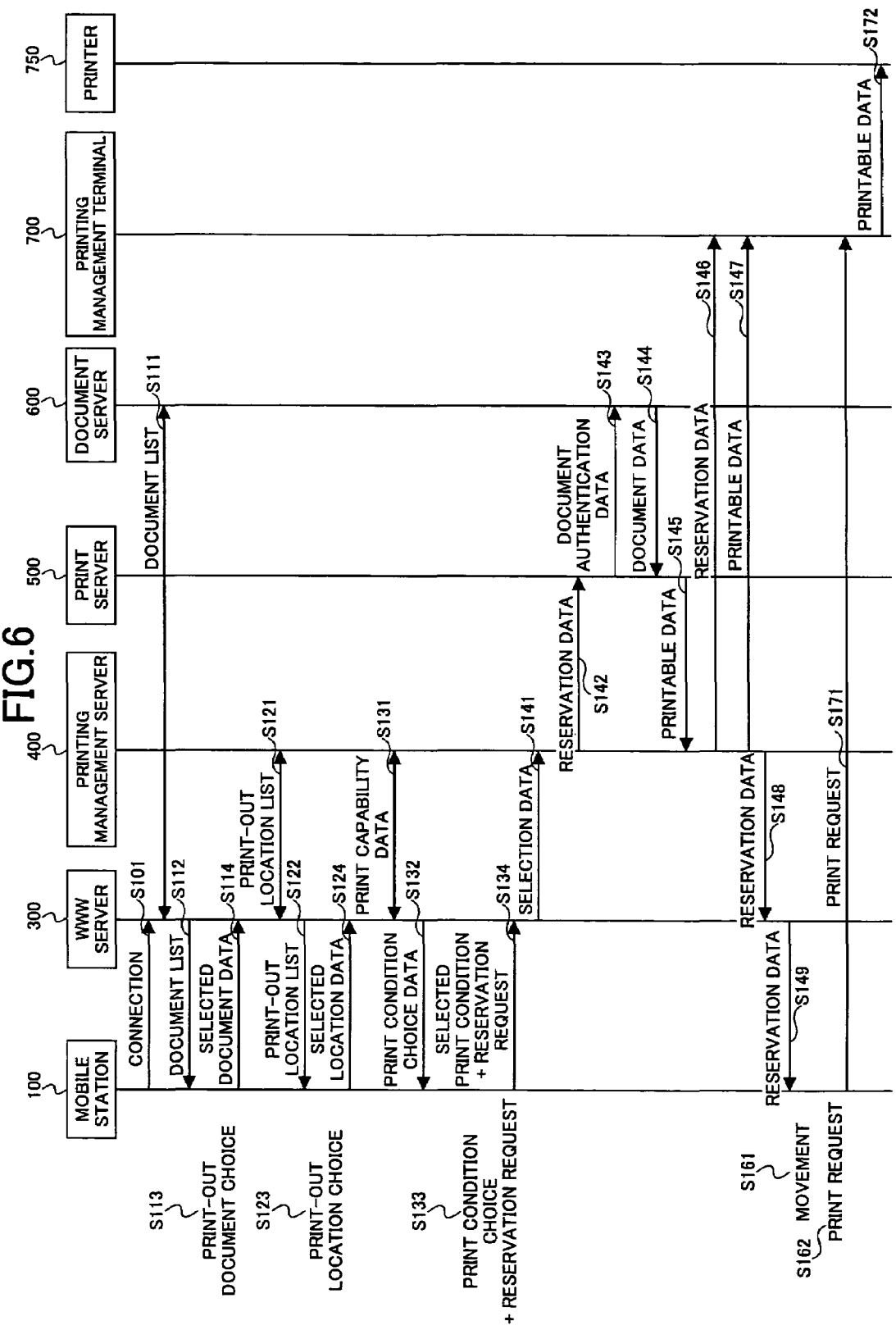
FIG. 6 is a communication sequence diagram for explaining a first preferred embodiment of the printing method of the invention.

Next, a description will be given of operation of the printing system of the present embodiment with reference to FIG. 6.

A plurality of documents are accumulated beforehand in the document server 600. Generally, the document server 600 is provided with such documents through the network 800 from a device connectable with the network 800, a personal computer (illustration is omitted) and others. For example, some of the stored documents in the document server 600 are edited on the personal computer before a trip of the user, or other stored documents are edited by the third person on the personal computer. The document server 600 is provided with various documents, and such documents are accumulated in the document server 600.

In the present embodiment, the documents are received through the web server 300 for every related user, and they are correlated with the related users and accumulated in the document server 600.

A description will now be given of operation of the printing system at the time of carrying out a printing reservation of the document accumulated in the document server 600.

In the present embodiment, the mobile station 100 may be either a cellular phone or a PDA. Moreover, the mobile station 100 may be a personal computer which can be carried by the user.

The user on the mobile station 100 starts execution of the viewer software program, called the browser, and carries out predetermined operation, so that a connection between the mobile station 100 and the web server 300 via the relay station 200 is established (S101). Authentication of the user at this time may be performed by either the relay station 200 or the web server 300. Alternatively, the authentication of the user may be performed on the both sides of the relay station 200 and the web server 300.

Moreover, the relay station 200 may be a connection node called the access point.

The web server 300 sends a request of a document list to the document server 600, and acquires the document list, which is related to the user who has connected to the web server 300 from the mobile station 100, from the document server 600 (S111).

In addition, the authentication of the user at this time may be performed by the document server 600, or may not be performed by the document server 600, which is predetermined depending on the degree of the security needed for the printing system.

In the present embodiment, the document server 600 searches the documents based on the user authentication information which is used for the user authentication by the relay station 200, the web server 300, or the document server 600. The document server 600 transmits to the web server 300 the corresponding document list which is searched.

The web server 300, which acquires the document list, generates the display data of the document list that is suited with the display capability of the mobile station 100, and transmits to the mobile station 100 the display data of the document list (SI 12).

An example of the display data of the document list is shown in FIG. 11. As shown in FIG. 11, the display data 1100 of the document list is the information for the user on the mobile station 100 to choose the document (called the printout document) which the user desires to be printed, and it is displayed on the display unit 102 of the mobile station 100.

In the example of FIG. 11, the display data 1100 contains the document names (the "1st document" through the "7th document") of the documents related to the user.

In addition, the display capability of the mobile station 100 is detected by the web server 300 based on the device information of the connected mobile station 100. For example, the device information is notified from the mobile station 100 to the web server 300 when the mobile station 100 is connected with the web server 300.

Moreover, the command or the like sent from the mobile station 100 is converted to be suitable for the SOAP request. Moreover, the information acquired from the document server 600 by using the SOAP communications is converted to be suitable for the display data generation. For example, when two SOAP requests are sent to the document server 600, two items of the information indicated by the two SOAP responses which are received at the document serber 600 are combined into one item, and the corresponding display data is generated with the combined information.

Such functions to convert the command from the mobile station 100 to be suitable for the SOAP request, and to convert the information acquired by the SOAP communications, to be suitable for the display data generation are achieved by the "plug-in" software.

The user views the document list on the display 102 of the mobile station 100, and chooses the print-out document by using the operation unit 103 of the mobile station 100 (S113).

The method of making the user choose the print-out document may be made to choose the check box or the like which is displayed on the display 102 of the mobile station 100 by making the user click. Alternatively, the number to the document name may be added and displayed on the display 102 of the mobile station 100, and the user is made to choose it by clicking the number.

In the example of FIG. 11, the print-out document is chosen by checking the check box displayed for every document name, and clicking the "OK" 1191. In addition, when the "return" 1192 is clicked, the control is transferred to the original screen of the display.

In addition, when there is the document classification of the directory, the folder, etc. about the documents accumulated in the document server 600, the user clicks the document classification of the directory, the folder, etc. displayed on the display 102 of the mobile station 100, and acquires the list of the documents belonging to the target document classification.

Specifically, the web server 300 sends a request of the list of the documents belonging to the directory or folder chosen by the user, to the document server 600, and transmits to the mobile station 100 the display data of the document list acquired from the document server 600.

When the print-out document is chosen by the mobile station 100, the web server 300 acquires the information (the "document specific information") which identifies the print-out document from the mobile station 100 (S114).

Moreover, the web server 300 acquires the information (the "document authentication information"), which is required for the authentication at the time of taking out the print-out document based on the document specific information, from the document server 600, and stores the document authentication information in the database 304 of the web server 300.

In the present embodiment, the document authentication information contains the document specific information. In addition, when only the document specific information is required at the time of taking out the document from the document server 600, it is not necessary to acquire the entire document authentication information from the document server 600.

Next, the web server 300 sends a request of a print-out location list to the printing management server 400, and acquires the print-out location list from the printing management server 400 (S121). The web server 300 generates the display data of the print-out location list that is suitable for the display capability of the mobile station 100, and transmits to the mobile station 100 the display data of the print-out location list (S122).

The display data of the print-out location list is displayed on the display 102 of the mobile station 100 as the information for the user choosing the print-out location of the print-out document on the mobile station 100.

The print-out location may be expressed with the name of the printer 750, the installation place of the printer 750, or the URL (uniform resource locator) of the printer 750. In short, it is adequate that the pinrt-out location is expressed with the information which identifies the printer 750 or the printing management terminal 700.

For example, when only one printer 750 is installed for every print-out location, the print-out location is expressed by the name of the installation place, for example, the post address of the company or the name of the department in the company.

The method of making the user to choose the print-out location may be such that the check box, support, etc. is displayed on the display 102 of the mobile station 100, and the user is requested to choose it by clicking the same. Alternatively, the number may be added to the print-out location, and it is displayed on the display 102 of the mobile station 100, and the user is requested to choose it by clicking the number.

An example of the display data of the print-out location list is shown in FIG. 12. As shown in FIG. 12, the display data 1200 of the print-out location list includes a plurality of names of the print-out locations which are displayed on the display 102 of the mobile station 100 as a candidate of the print-out location being selected.

The user views the print-out location list on the display 102 of the mobile station 100, and chooses the print-out location of the print-out document by using the operation unit 103 of the mobile station 100 (S123).

In the example of FIG. 12, the print-out location is chosen by choosing the name of the location indicating the print-out location and clicking the "OK" 1291. In addition, when the "return" 1292 is clicked, the control of the control unit 105 is transferred to the original screen of the display.

When the print-out location is chosen by the mobile station 100, the web server 300 acquires the information (which is the print-out location specific information) which identifies the selected print-out location of the print-out document from the mobile station 100 (S124).

Moreover, the web server 300 stores the print-out location specific information in the database 304 of the web server 300. In the present embodiment, the print-out location specific information includes any of the identification information of the location of the print-out location, the identification information of the printer, the IP address of the print-out location, the MAC address of the print-out location, the network path of the print-out location, and the print-server name of the print-out location.

Next, the web server 300 sends a request of a printing functional information indicating the printing function of the print-out location, to the printing management server 400, and acquires the printing functional information of the print-out location from the printing management server 400 (S131).

The web server 300 generates the display data of the printing condition selection information suitable for the display capability of the mobile station 100 based on the printing functional information, and transmits to the mobile station 100 the display data of the printing condition selection information (S132).

Figure 13:
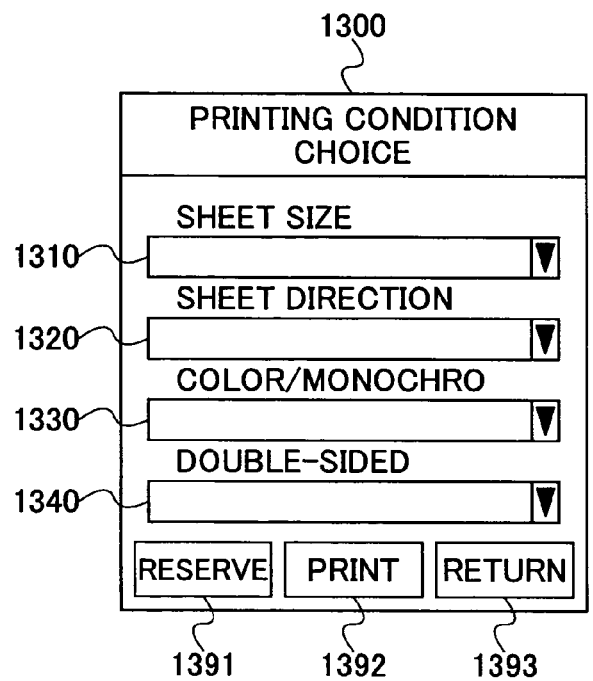
FIG. 13 is a diagram showing a display data of printing condition choice displayed on a mobile station in the printing system of the present embodiment.

An example of the display data of the printing condition selection information is shown in FIG. 13.

In the example of FIG. 13, the display data 1300 of the printing condition selection information is displayed on the display 102 of the mobile station 100 as the information for the user choosing the printing conditions with the mobile station 100.

In the example of FIG. 13, the sheet size 1310, the sheet orientation 1320 (length/width), the color/monochrome printing 1330, and the double-sided printing 1340 can be chosen. In addition, the printing conditions which can be chosen may change with the classification of the printer 750. As such printing conditions, there are the color/monochrome printing, the double-sided printing, the intensive printing, the sheet size, the magnification, the quality of image, the sheet tray, the output tray, the stapler binding, the form kind, the sorting, the punch, the composition, the printing direction, the sheet orientation, the printing number of copies, etc.

The user views the printing condition selection information on the display 102 of the mobile station 100, and inputs the printing reservation command from the operation unit 103 of the mobile station 100 while choosing the printing conditions (S133).

In the example of FIG. 13, the printing conditions which are selectable by the user are the sheet size 1310, the sheet orientation 1320, the color/monochrome printing 1330, and the double-sided printing 1340. And the user clicks the "reservation" 1391 when requesting the reservation of printing, and clicks the "printing" 1392 when requesting the printing directly. In addition, when the "return" 1393 is clicked, the control is transferred to the original screen of the display.

When the printing reservation is clicked with the mobile station 100, the web server 300 acquires the information (the "printing condition information") which indicates the printing conditions of the print-out document, as well as the reservation request, from the mobile station 100 (S134).

In addition, when the direct printing is clicked with the mobile station 100, the web server 300 acquires the printing condition information and the printing request from the mobile station 100.

Next, the web server 300 provides the printing management server 400 with the information (the "selection information") acquired by the selection of the user, such as the document authentication information, the print-out location specific information, and the printing condition information, and notifies the reservation request from the user to the printing management server 400 (S141).

In the present embodiment, the document authentication information is the information used for authentication by the document server 600 at the time of taking out the print-out document from the document server 600, and is the information which is acquired from the document server 600 including the document specific information identifying the print-out document, and is stored in the database 304 of the web server 300.

Moreover, the document specific information, the print-out location specific information, and the printing condition information are the information which is acquired from the mobile station 100 and stored in the database 304 of the web server 300.

In addition, the web server 300 stores the document authentication information and the print-out location specific information. Alternatively, it is possible to transmit the printing condition information to the printing management server 400 without storing the same in the web server 300.

The printing management server 400 generates the reservation information based on the selection information received from the web server 300. In the present embodiment, the reservation information contains the reservation number, the reservation name, the document authentication information including the document specific information (the document name or the document set name in the case of a plurality of print-out documents), the document classification, the total data size of the print-out document, the print-out location specific information, the printing condition information, the reservation date indicating the date when the printing reservation is performed, the term indicating the permissible term within which the document can be printed, the user identification information which identifies the user who performed the printing reservation, the password, the printing authority information, the data storing location information which can be printed, the printing document data storing location information, and the information about other printing reservation. A part of the data storing location information will be registered into the reservation information at a following step which will be described later.

The printing management server 400 transmits to the print server 500 the generated reservation information (S142).

The print server 500, which has received the reservation information, notifies the document authentication information to the document server 600 (S143), and acquires the document data from the document server 600 (S144).

Moreover, the print server 500 determines whether it is the printable data by the printer 750 of the print-out location which is indicated by the print-out location specific information. When it is not the printable data by the printer 750 of the print-out location, it is converted into the data ("the printable data") which can be printed by the printer 750 of the print-out location, and the print server 500 provides the printing management server 400 with the printable data that can be printed (S145).

Specifically, the above-described data conversion is performed as follows. The print server 500 detects an application program corresponding to the print-out document, such as the PostScript (registered trademark) which can edit the document data, and causes the application program to convert the print-out document into the printable data suited to the application program. The detection of the application program is performed based on any of a file extention of the print-out document, a file type of the print-out document, and an attribute data of the print-out document. The document data, the classification information of the printer 750 of the print-out location, and the printing condition information are sent to the application program, and the application program chooses a suitable print driver, so that the print driver converts the document data into the printable data which can be printed by the printer 750.

The printing management server 400 stores the printable data which was acquired from the print server 500, registers into the reservation information the printable data storing location information, and provides the printing management terminal 700 indicated by the print-out location specific information, with the reservation information (S146).

The printing management terminal 700 which received the reservation information acquires the printable data from the printing management server 400 based on the printable data storing location information included in the reservation information (S147).

In addition, when the print-out document accumulated at the document server 600 is in the form of printable data which can be printed by the printer 750, the print-out document accumulated at the document server 600 as it is or the original data is acquired from the printing management server 400. In the present embodiment, the case where the printing management terminal 700 takes the printable data to the printing management server 400 has been explained. Alternatively, as for the present invention, the printable data may be transmitted to the printing management terminal 700 with the reservation information from the printing management server 400.

Moreover, the printing management server 400 provides the web server 300 with reservation information, and notifies the completion of reservation to it (S148). The web server 300 which received reservation information provides the mobile station 100 with reservation information, and notifies the completion of reservation to it (S149).

Moreover, the web server 300 generates the display data which shows the completion of reservation united with the screen-display capacity of the mobile station 100, and provides the mobile station 100 with it.

Figure 14:
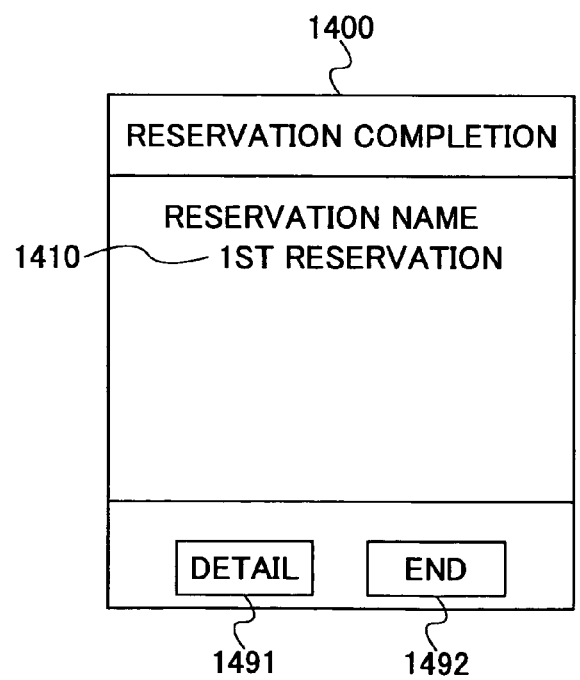
FIG. 14 is a diagram showing a display data of reservation completion displayed on a mobile station in the printing system of the present embodiment.

FIG. 14 shows an example of the display data of the completion of reservation. As shown in FIG. 14, the display data 1400 of the completion of reservation indicates the reservation name 1410 which identifies the reservation.

When the user clicks the "detail" 1491 of FIG. 14, the contents of reservation information are displayed. In addition, when the user clicks the "end" 1492, the display data disappears and the control is finished.

The display 102 of the mobile station 100 displays the display data which shows the completion of reservation, and shows the user the completion of reservation.

Moreover, the storage unit 104 of the mobile station 100 stores the reservation information (the reservation identification information and printing authority information are included) received from the web server 300. The stored reservation information is used by the authentication at the time of the printing specification which will be described later.

In addition, URL to which the way it took out the reservation information with the storing location of the reservation information in the printing management server 400 in the case of the device which cannot be saved by the file etc. although the mobile station 100 should just save reservation information by the file in the case of the device which can be saved by the file etc. was expressed is stored as a bookmark etc.

The user who carries the mobile station 100 moves to the print-out location (S161), and operates the mobile station 100 to request the printing (S162).

Figure 15:
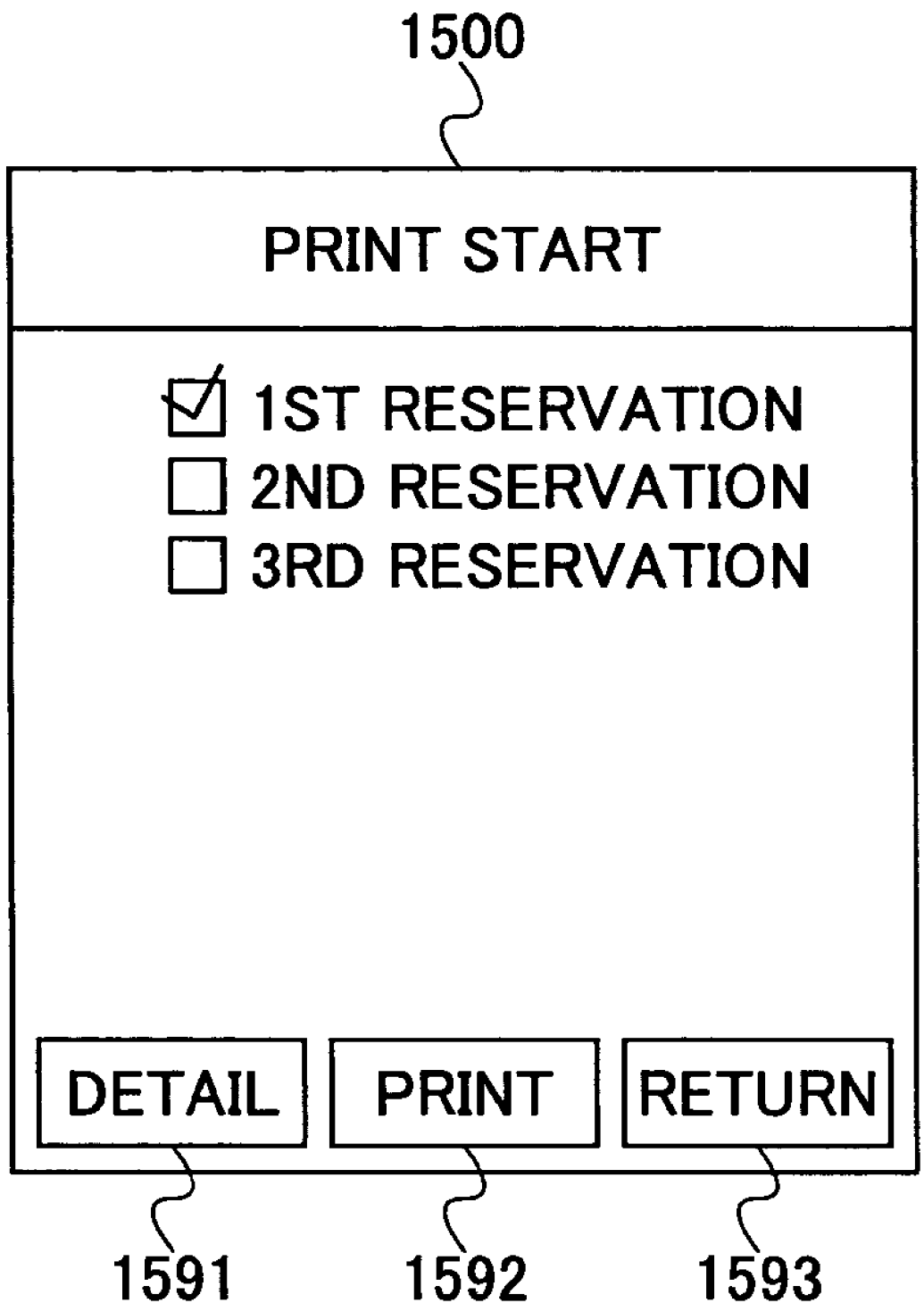
FIG. 15 is a diagram showing a display data of print start displayed on a mobile station in the printing system of the present embodiment.

FIG. 15 shows an example of the display data of the printing start displayed on the display 102 of the mobile station 100 when requesting the printing.

As shown in FIG. 15, the display data 1500 of the printing start is displayed on the display 102 of the mobile station 100 as the information for choosing printing reservation. In addition, the mobile station 100 may be connected with the web server 300, and the display data may be received from the web server 300. Alternatively, the display data may be generated by the control unit 105 of the mobile station 100.

As shown in FIG. 15, the reservation names (the "first reservation" to the "third reservation") which can be reserved by the user are displayed. The user clicks the desired reservation name by the operation unit 103 of the mobile station 100, and printing of the clicked reservation name is started by clicking the "printing" 1592.

In addition, when the "detail" 1591 is clicked, the reservation information is displayed on the display 102 of the mobile station 100. When the "return" 1593 is clicked, the control is returned to the original screen of the display.

The mobile station 100 which received the printing request from the user transmits the reservation information (the reservation identification information and the printing authority information are included) to the printing management terminal 700 (S171).

In addition, the communication between the mobile station 100 and the printing management terminal 700 is performed by, for example, the short distance radio communications called bluetooth. Instead of the bluetooth, it is possible to use the infrared ray communication, the wireless LAN, or the wired or cable communication by the cellular-phone interconnection cable, the LAN cable, the serial cable, the USB (Universal Serial Bus) cable, etc.

Moreover, the mobile station 100 may be connected with the web server 300, and it is possible to communicate with the printing management terminal 700 through the web server 300.

The printing management terminal 700 checks a matching between the reservation information acquired from the mobile station 100 and the reservation information beforehand acquired from the printing management server 400. When the matching occurs, the printing management terminal 700 provides the printer 750 with the printable data, or the original data (S172).

The printing management terminal 700 checks at least a matching between the reservation identification information acquired from the mobile station 100 and the reservation identification information beforehand acquired from the printing management server 400. Moreover, the printing management terminal 700 may check a matching between the printing authority information acquired from the mobile station 100 and the printing authority information beforehand acquired from the printing management server 400.

And the printer 750, which acquired the printable data, prints the print-out document or the original data.

In addition, the user can also make the printing of the selected printing document under the printing conditions chosen as the selected print-out location without carrying out the printing reservation.

As mentioned above, when direct printing is clicked with the mobile station 100, the web server 300 acquires the printing condition information and the printing request from the mobile station 100 (for example, when the "printing" 1392 of FIG. 13 is clicked by using the operation unit 103 of the mobile station 100).

And in the web server 300, the printing management server 400 is provided with the information, such as document authentication information, print-out location specific information, and printing condition information, when the print-out document is not the printable data by the printer 750, the print server 500 converts the print-out document into the printable data, the printing management terminal 700 acquires the printable data, or the original data through the printing management server 400, and the printer 750 carries out the printing.

However, the printing may be finished before the time the user arrives at the location of the printer 750, if the user is distant from the location where the printer 750 is installed. There is the danger that others have the user's printed matter away, or the contents of the user's document are viewed by others. To avoid this, the user carries out the printing reservation, and after arriving at the location of the printer 750, it is possible to start the printing of the desired document corresponding to the printing reservation.

As described above, the printing system of the present embodiment acquires the document specific information with which the web server 300 identifies the print-out document indicated by the mobile station 100, and notifies it to the printing management server 400. The printing management server 400 generates the reservation identification information, and notifies to the web server 300. The web server 300 notifies the reservation identification information to the mobile station 100. When the print-out document is in the form which cannot be printed by the printer 750, the print server 500 converts the print-out document into the printable data by the printer 750. The printing management terminal 700 acquires the printable data converted by the print server 500 or the original data through the printing management server 400. The printer 750 performs the printing of the print-out document when the reservation identification information is inputted to the printing management terminal 700 from the mobile station 100.

The user carries out the printing reservation in the case where there is no printer 750 in the vicinity of the user when the user chooses the print-out document. It is not necessary to install the print driver in the mobile station 100. When the user arrives at the printer 750, it is able to print the selected document by the printer 750. Therefore, the user can acquire the desired printed matter certainly at the print-out location.

Moreover, the user can certainly receive the printed matter of the reserved printing document on the reserved printing conditions at the reserved print-out location.

In addition, the print server 500 generally has the function of converting the documents of various types into the printable data that is printable at the print-out location, and the document selected by the user will be printed at the print-out location certainly or without fail.

Even when it is the case where the document selected by the user cannot be converted into the printable data by the print server 500, the print server 500 is provided to inform the user of the mobile station 100 through the web server 300 that the selected document cannot be converted into the printable data and cannot be printed. The user who receives that information can change the print-out location and the printing conditions beforehand, and therefore the user can acquire the desired printed matter certainly at the print-out location.

Moreover, although the form of the above-mentioned operation explained the case where the user chose printing conditions with the mobile station 100, if it is the thing as which default printing conditions are sufficient, the user does not need to choose printing conditions with the mobile station 100. Thus, when the user does not choose printing conditions and selection of the print-out document and selection of the print-out location are completed with the mobile station 100, it is possible to be made to carry out the reservation request at the web server 300 from the mobile station 100.

In the previously described embodiment, the communication unit 301 of the web server 300 acquires the print-out location list and the printing functional information for every print-out location from the printing management server 400. Alternatively, the previous embodiment may be modified so that the database 304 of the web server 300 stores the print-out location list and the printing functional information for every print-out location, and the control unit 305 of the web server 300 acquires from the database 304 of the web server 300 the print-out location list and the printing functional information for every print-out location. In such modified embodiment, it is possible for the control unit 305 to generate the information which should be provided to the mobile station 100, based on the acquired information.

In the previously described embodiment, after the printing management terminal 700 acquires the printable data, the web server 300 notifies to the mobile station 100 of the completion of the printing reservation. Alternatively, the previous embodiment may be modified so that, after the printing management server 400 receives the selection information from the web server 300 and generates the reservation information, the web server 300 notifies to the mobile station 100 of the completion of the printing reservation. In such modified embodiment, when it does not result until the printing management terminal 700 carried out the completion of the acquisition of the printable data, the web server 300 may notify to the mobile station 100 that the printing management terminal 700 has not acquired the printable data.

In the previously described embodiment, the mobile station 100 is provided with the whole reservation information from the web server 300. Alternatively, the present invention may include the case where a part of the reservation information is provided to the mobile station 100. For example, it is possible to make it provide the mobile station 100 only with the reservation identification information and the printing authority information.

In the previously described embodiment, the mobile station 100 stores the reservation information when the printing reservation is completed. Alternatively, the present invention may include the case where the mobile station 100 does not store the reservation information. For example, it is possible to make it store only the reservation identification information in the mobile station 100.

Moreover, the present invention may include the case where the user writes down the reservation identification information manually by displaying the reservation identification information on the display 102 of the mobile station 100 when the printing reservation is completed. In such a case, when requesting the printing, the user inputs the reservation identification information by using the ten keys, the keyboard, or the voice input at the printing management terminal 700.

In the previously described embodiment, the web server 300 generates the e-mail for the transfer with the reservation information and transmits the e-mail with the reservation information to the different mobile station 100. Alternatively, the previous embodiment may be modified so that the control unit 105 of the mobile station 100 generates the e-mail for the transfer with the reservation information and the communication unit 101 of the mobile station 100 transmits the e-mail with the reservation information to the different mobile station 100.

Moreover, the reservation identification information may be the identification information given per user, instead of the identification information given per reservation, and the user identification information which identifies the user may be used as the reservation identification information. It is possible to be the user number which may be the user name itself and is given per user as the user identification information, for example, and may be the physical feature information of the user of the fingerprint and others. Specifically, when the reserved document with which the printing reservation is carried out is printed, the input of the user identification information is received by the printing management terminal 700, and the printable data or the original data corresponding to the user identification information is transmitted to the printer 750. Under such circumstances, when the user carries out the printing reservation for two or more documents, the printing management terminal 700 is provided to receive the information of the selection of the print-out document.

Figure 7:
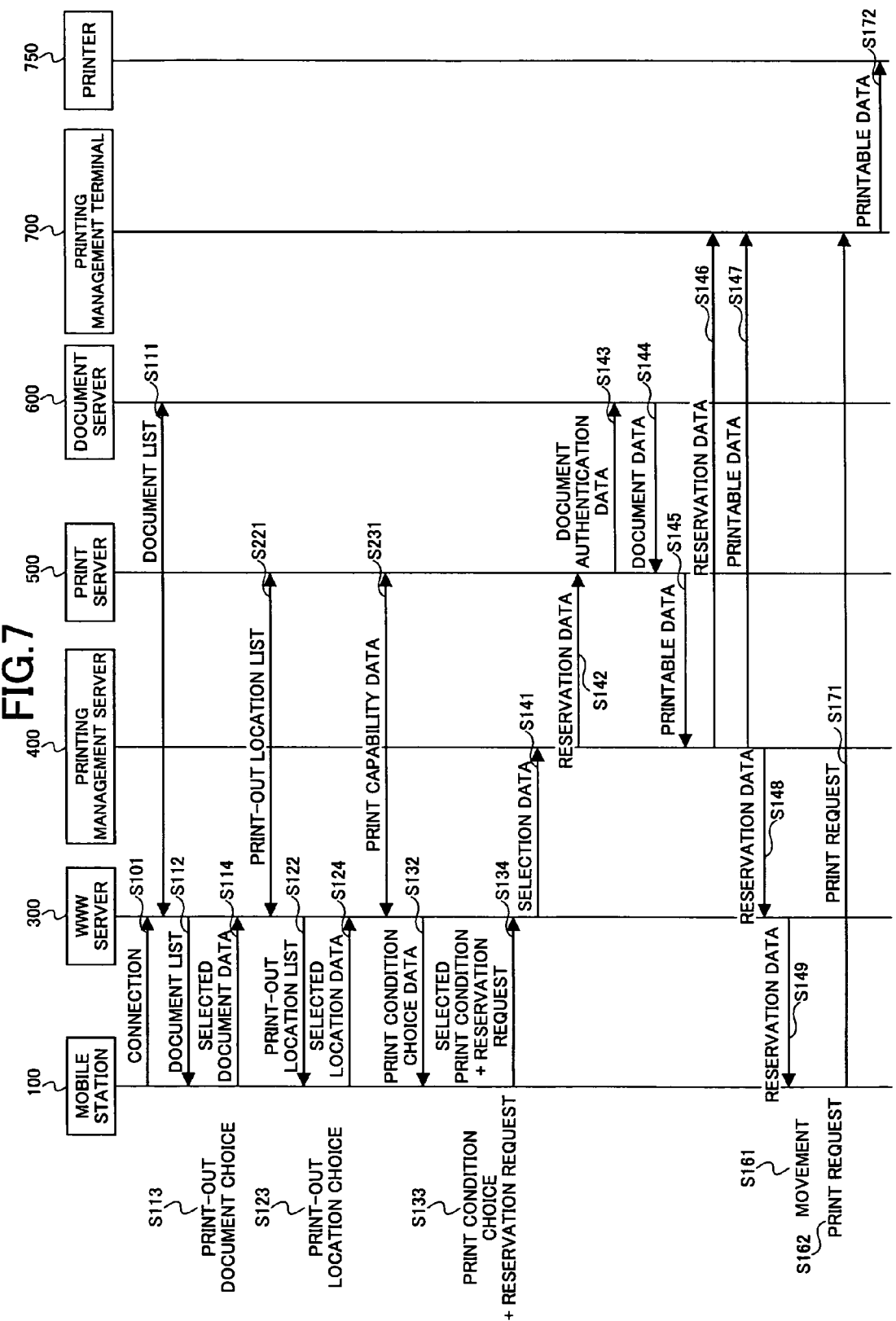
FIG. 7 is a communication sequence diagram for explaining a second preferred embodiment of the printing method of the invention.

Next, a description will be given of the second preferred embodiment of the printing method of the invention with reference to FIG. 7.

In the second preferred embodiment, unlike the first preferred embodiment, the print server 500 stores the print-out location list and the printing functional information for every print-out location. As shown in FIG. 7, the web server 300 acquires the print-out location list and the printing functional information from the print server 500 (S221, S231). In addition, it may be made for the printing management server 400 to relay the print-out location list and the printing functional information. Specifically, after the printing management server 400 acquires the same from the print server 500, it is possible to make the web server 300 acquire the same from the printing management server 400.

Figure 8:
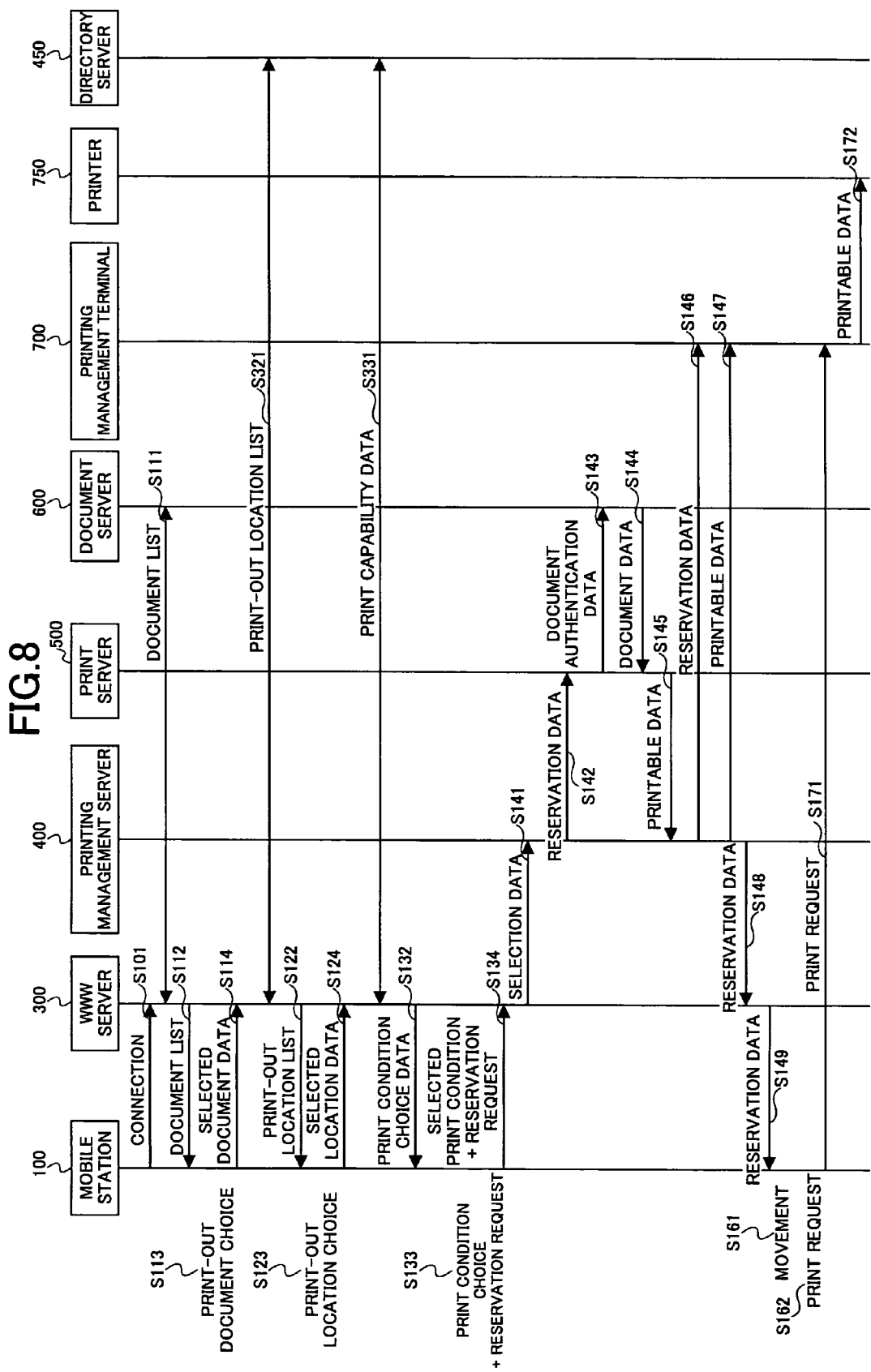
FIG. 8 is a communication sequence diagram for explaining a third preferred embodiment of the printing method of the invention.

Next, a description will be given of the third preferred embodiment of the printing method of the invention with reference to FIG. 8.

In the third preferred embodiment, unlike the first preferred embodiment, the directory server 450 stores the print-out location list and the printing functional information for every print-out location. As shown in FIG. 8, the web server 300 acquires the print-out location list and the printing functional information from the directory server 450 (S321, S331). In addition, it may be made for the printing management server 400 to relay the print-out location list and the printing functional information. Specifically, after the printing management server 400 acquires the same from the directory server 450, it is possible to make the web server 300 acquire the same from the printing management server 400.

Next, a description will be given of the fourth preferred embodiment of the printing method of the invention with reference to FIG. 9.

Figure 9:
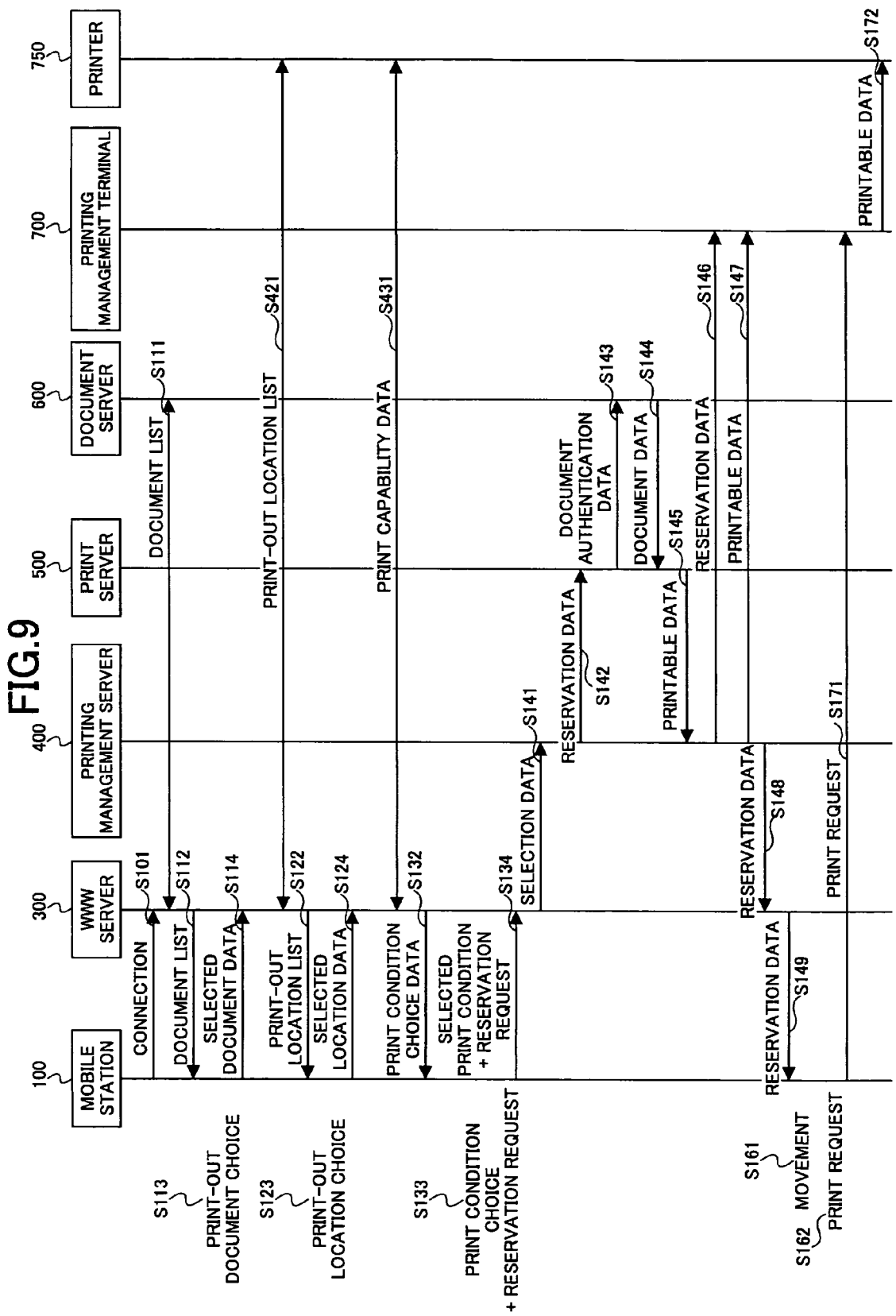
FIG. 9 is a communication sequence diagram for explaining a fourth preferred embodiment of the printing method of the invention.

In the fourth preferred embodiment, unlike the first preferred embodiment, as shown in FIG. 9, the web server 300 acquires the print-out location information and the printing functional information from the printer 750 (S421, S431). In addition, it may be made for the printing management server 400 to relay the print-out location information and the printing functional information. Specifically, after the printing management sever 400 acquires the same from the printer 750, it is possible to make the web server 300 acquire them from the printing management server 400.

Next, a description will be given of the fifth preferred embodiment of the printing method of the invention with reference to FIG. 10.

Figure 10:
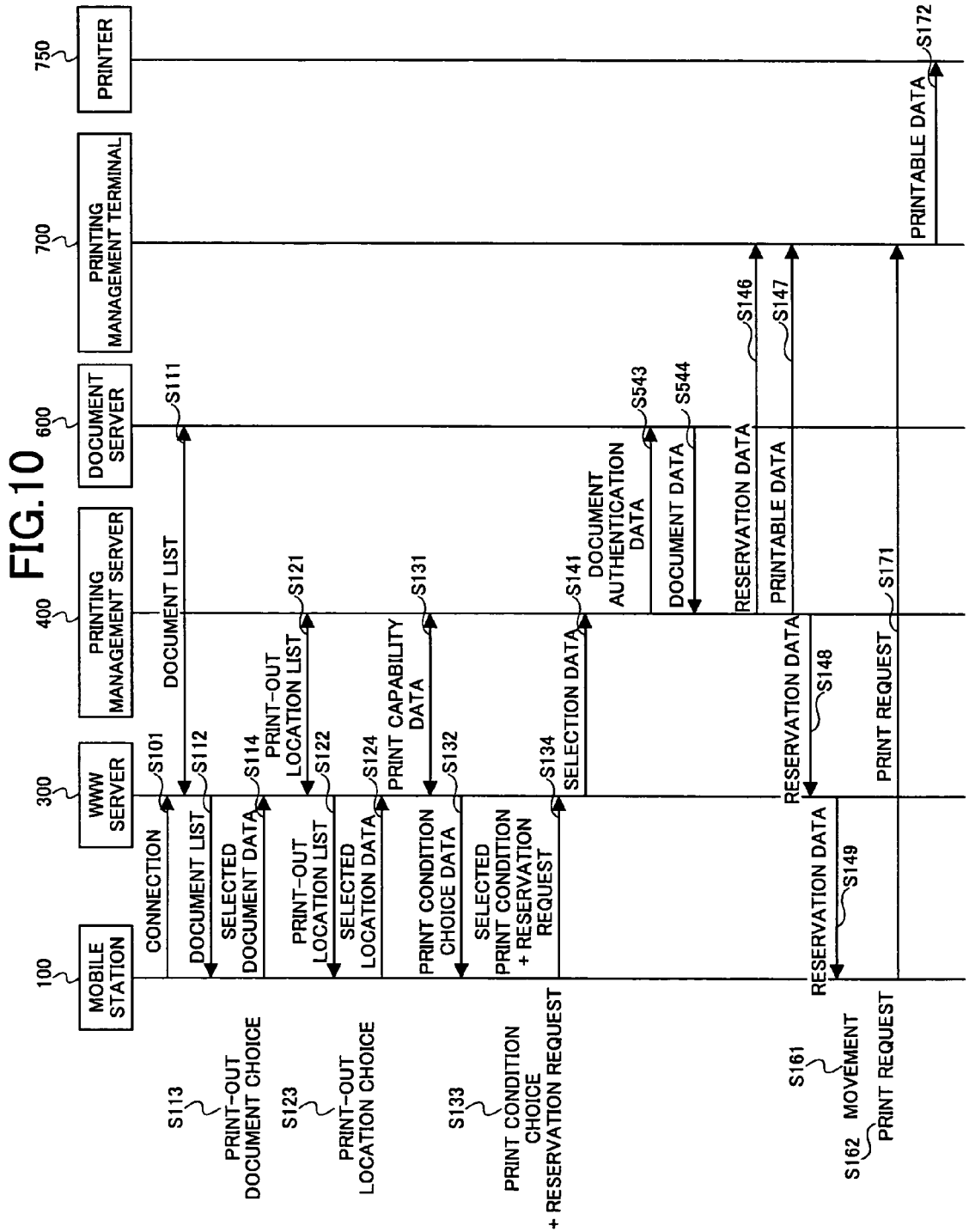
FIG. 10 is a communication sequence diagram for explaining a fifth preferred embodiment of the printing method of the invention.

In the fifth preferred embodiment, unlike the first preferred embodiment, as shown in FIG. 10, the printing management server 400 acquires the document data from the document server 600 and converts the document data into the printable data (S543, S544).

In the previously described embodiment, the mobile station 100 displays the presentation information for the user, such as the document list, the print-out location list, and the printing 5 condition selection information, on the screen of the display unit, indicating such information to the user. Alternatively, the previous embodiment may be modified so that the voice-output unit 107 is provided in the mobile station 100 to output the presentation information to the user with voice. Alternatively, the braille-points signal generating unit may be provided in the mobile station 100, and the presentation information may be indicated to the user with the braille points.

Moreover, in the previously described embodiment, the user of the mobile station 100 performs the inputting operation (or the key operation) of the selection information, such as the printing document selection, the print-out location selection, and the printing condition selection. Alternatively, the previous embodiment may be modified so that the inputting operation of the selection information from the user of the mobile station 100 is performed with voice by using the voice input unit 106.

Moreover, in the above-mentioned embodiment, any of a printer, a facsimile and a copier may be used as the printer 750, and a computer or the like may be used as the image forming apparatus which forms an image.

Moreover, the printing method of the invention is attained by supplying the program to the computer. In this case, the technical objective of the invention can be achieved by storing the program for causing a computer to execute the printing method of the invention, into a computer-readable storage medium of the computer, and reading the program from the storage medium, and executing the program.

The present invention is not limited to the above-described embodiments, and variations and modifications may be made without departing from the scope of the present invention.

Further, the present application is based on Japanese priority application No. 2002-379959, filed on Dec. 27, 2002, Japanese priority application No. 2003-000882, filed on Jan. 7, 2003, and Japanese priority application No. 2003-000962, filed on Jan. 7, 2003, the entire contents of which are hereby incorporated by reference.

What is claimed is:

1. A printing system designed to operate on a network, comprising:
   a printing terminal connected to the network and printing a print-out document;
   a communication terminal connected to the network and transmitting a request of the print-out document;
   a WWW server connected to the network and communicating with the communication terminal via the network;
   a printing management device connected to the network and transmitting a printing-related data to the communication terminal through the WWW server; and
   a document converter connected to the network and converting the print-out document into a printable data for the printing terminal when the print-out document is not in a printable form that is appropriate for the printing terminal,
   wherein the printing management device receives a document specific data identifying the print-out document from the communication terminal and transmits the document specific data to the document converter, the printing management device transmits a first reservation identification data identifying a printing reservation of the print-out document to both the communication terminal and the printing terminal, and the printing terminal performs printing of the print-out document with the printable data when a second reservation identification data received from the communication terminal at the printing terminal matches the first reservation identification data received from the printing management device at the printing terminal.

2. The printing system according to claim 1 further comprising a print-out location storage unit storing a print-out location data for a plurality of print-out locations, contained in the printing-related data, wherein the printing management device transmits the print-out location data to the WWW server via the network.

3. The printing system according to claim 2 wherein the printing management device comprises the print-out location storage unit.

4. The printing system according to claim 2 wherein the printing management device receives the print-out location data by transmitting a request to another device connected to the network.

5. The printing system according to claim 2 wherein the printing management device receives the print-out location data by accessing the printing terminal connected to the network.

6. The printing system according to claim 2 wherein the print-out location data comprises a print-out location list.

7. The printing system according to claim 6 wherein the print-out location list contains any of a print-out location identification data, a printer identification data, an IP address of the print-out location, a MAC address of the print-out location, a network path of the print-out location, and a print-server name of the print-out location.

8. The printing system according to claim 2 wherein the print-out location data comprises a printing functional data for every print-out location.

9. The printing system according to claim 8 wherein the printing functional data contains any of a color/monochrome printing, a double-sided printing, an intensive printing, a sheet size, a magnification, a quality of image, a sheet tray, an output tray, a stapler binding, a form kind, a sorting, a punch, a composition, a printing direction, and a sheet orientation.

10. The printing system according to claim 1 wherein the printing management device receives the document specific data identifying the print-out document from the WWW server and transmits the document specific data to the document converter, and the printing management device transmits the printable data from the document converter to the printing terminal.

11. The printing system according to claim 10 wherein the printing management device receives an access right data, a print-out location specific data, and a printing condition data of the print-out document from the WWW server, and transmits the access right data, the print-out location specific data, and the printing condition data to the document converter.

12. The printing system according to claim 10 wherein the printing management device transmits to the document converter a document name of the print-out document or a document set name for a set of print-out documents, a total data size, a reservation date, a user identification data, a term, a reading authority, and a printing authority.

13. The printing system according to claim 1 wherein the printing management device generates a reservation data containing the reservation identification data identifying the printing reservation of the print-out document, and transmits the reservation data to both the printing terminal and the WWW server.

14. The printing system according to claim 13 wherein the reservation data contains any of a printing reservation number, a printing reservation name, a document name of the print-out document or a document set name for a set of print-out documents, a total data size of the print-out document, a print-out location specific data, a printing condition data, a reservation date indicating a date when the printing reservation is performed, a term indicating a permissible term within which the print-out document can be printed, a user identification data identifying a user who performs the printing reservation, a password, and a printing authority.

15. A printing management device for use in a printing system, the printing system designed to operate on a network and comprising a printing terminal connected to the network and printing a print-out document, a communication terminal connected to the network and transmitting a request of the print-out document, a WWW server connected to the network and communicating with the communication terminal via the network, a document converter connected to the network and converting the print-out document into a printable data for the printing terminal when the print-out document is not in a printable form that is appropriate for the printing terminal, and the printing management device connected to the network and transmitting a printing-related data to the communication terminal through the WWW server, the printing management device comprising:

a first unit acquiring a document specific data identifying the print-out document from the communication terminal and transmitting the document specific data to the document converter;

a second unit transmitting a first reservation identification data identifying a printing reservation of the print-out document to both the communication terminal and the printing terminal; and a third unit transmitting the printable data from the document converter to the printing terminal, so that the printing terminal performs printing of the print-out document with the printable data when a second reservation identification data received from the communication terminal at the printing terminal matches the first reservation data received from the printing management device at the printing terminal.

16. The printing management device according to claim 15 wherein, when a print-out location storage unit which stores a print-out location data for a plurality of print-out locations, contained in the printing-related data, is connected to the network, the printing management device transmits the print-out location data to the WWW server via the network.

17. The printing management device according to claim 16 wherein the print-out location data comprises a print-out location list.

18. The printing management device according to claim 17 wherein the print-out location list contains any of a print-out location identification data, a printer identification data, an IP address of the print-out location, a MAC address of the print-out location, a network path of the print-out location, and a print-server name of the print-out location.

19. The printing management device according to claim 16 wherein the print-out location data comprises a printing functional data for every print-out location.

20. The printing management device according to claim 19 wherein the printing functional data contains any of a color/monochrome printing, a double-sided printing, an intensive printing, a sheet size, a magnification, a quality of image, a sheet tray, an output tray, a stapler binding, a form kind, a sorting, a punch, a composition, a printing direction, and a sheet orientation.

21. The printing management device according to claim 15 further comprising a print-out location storage unit which stores a print-out location data for a plurality of print-out locations, contained in the printing-related data, and is connected to the network, wherein the printing management device transmits the print-out location data to the WWW server via the network.

22. The printing management device according to claim 15 wherein the printing management device receives the print-out location data by transmitting a request to another device connected to the network.

23. The printing management device according to claim 15 wherein the printing management device receives the print-out location data by accessing the printing terminal connected to the network.

24. The printing management device according to claim 15 wherein the printing management device receives the document specific data identifying the print-out document from the WWW server and transmits the document specific data to the document converter, and the printing management device transmits the printable data from the document converter to the printing terminal.

25. The printing management device according to claim 24 wherein the printing management device receives an access right data, a print-out location specific data, and a printing condition data of the print-out document from the WWW server, and transmits the access right data, the print-out location specific data, and the printing condition data to the document converter.

26. The printing management device according to claim 24 wherein the printing management device transmits to the document converter a document name of the print-out document or a document set name for a set of print-out documents, a total data size, a reservation date, a user identification data, a term, a reading authority, and a printing authority.

27. The printing management device according to claim 15 wherein the printing management device generates a reservation data containing the reservation identification data identifying the printing reservation of the print-out document, and transmits the reservation data to both the printing terminal and the WWW server.

28. The printing management device according to claim 27 wherein the reservation data contains any of a printing reservation number, a printing reservation name, a document name of the print-out document or a document set name for a set of print-out documents, a total data size of the print-out document, a print-out location specific data, a printing condition data, a reservation date indicating a date when the printing reservation is performed, a term indicating a permissible term within which the print-out document can be printed, a user identification data identifying a user who performs the printing reservation, a password, and a printing authority.

29. A computer-readable storage medium storing a program embodied therein for causing a computer of a printing management device to execute a printing method, the printing management device adapted for use in a printing system, the printing system designed to operate on a network and comprising a printing terminal connected to the network and printing a print-out document, a communication terminal connected to the network and transmitting a request of the print-out document, a WWW server connected to the network and communicating with the communication terminal via the network, a document converter connected to the network and converting the print-out document into a printable data for the printing terminal when the print-out document is not in a printable form that is appropriate for the printing terminal, and the printing management device connected to the network and transmitting a printing-related data to the communication terminal through the WWW server, the printing method comprising:

acquiring a document specific data identifying the print-out document from the communication terminal and transmitting the document specific data to the document converter;

transmitting a first reservation identification data identifying a printing reservation of the print-out document to both the communication terminal and the printing terminal; and transmitting the printable data from the document converter to the printing terminal, so that the printing terminal performs printing of the print-out document with the printable data when a second reservation identification data received from the communication terminal at the printing terminal matches the first reservation identification data received from the printing management device at the printing terminal.

\* \* \* \* \*